US012801351B2

(12) United States Patent
Campos

(10) Patent No.: US 12,801,351 B2
(45) Date of Patent: Nov. 17, 2026

(54) ARCHITECTURAL SPECIFICATION DEVELOPMENT PLATFORM

(71) Applicant: OVERHEAD DOOR CORPORATION, Lewisville, TX (US)

(72) Inventor: Jose Elias Campos, Plano, TX (US)

(73) Assignee: Overhead Door Corporation, Lewisville, TX (US)

( * ) Notice: Subject to any disclaimer, the term of this patent is extended or adjusted under 35 U.S.C. 154(b) by 270 days.

(21) Appl. No.: 18/635,557

(22) Filed: Apr. 15, 2024

(65) Prior Publication Data

US 2025/0321713 A1 Oct. 16, 2025

(51) Int. Cl.

| | |
|---|---|
| ***G06F 8/10*** | (2018.01) |
| ***G06F 3/0482*** | (2013.01) |
| ***G06F 3/0483*** | (2013.01) |
| ***G06F 3/0484*** | (2022.01) |
| ***G06F 16/958*** | (2019.01) |
| ***G06F 40/134*** | (2020.01) |
| ***G06F 40/174*** | (2020.01) |
| ***G06F 40/186*** | (2020.01) |

(52) U.S. Cl.

CPC .............. *G06F 8/10* (2013.01); *G06F 3/0482* (2013.01); *G06F 3/0483* (2013.01); *G06F 3/0484* (2013.01); *G06F 16/986* (2019.01); *G06F 40/134* (2020.01); *G06F 40/174* (2020.01); *G06F 40/186* (2020.01)

(58) Field of Classification Search

CPC .... G06F 16/986; G06F 3/0482; G06F 3/0483; G06F 3/0484; G06F 30/13; G06F 40/134; G06F 40/174; G06F 40/186; G06F 8/10

See application file for complete search history.

(56) References Cited

U.S. PATENT DOCUMENTS

| | | | |
|---|---|---|---|
| 7,162,688 | B1 | 1/2007 | Gillig |
| 8,578,262 | B2 | 11/2013 | Averitt |
| 8,706,646 | B2 | 4/2014 | Jannott |
| 9,003,358 | B2 | 4/2015 | Sellers |
| 9,110,870 | B1 | 8/2015 | Averitt |

(Continued)

FOREIGN PATENT DOCUMENTS

WO WO-2022125992 A1 * 6/2022 ............... G06F 8/38

*Primary Examiner* — Hanh Thi-Minh Bui

(74) *Attorney, Agent, or Firm* — Haynes and Boone, LLP

(57) ABSTRACT

Systems and methods for providing a specification development platform include a system provider device that receives a first selection of a product type via a first webpage, the first selection causing rendering of a second webpage displaying a plurality of configuration types corresponding to the product type. The second webpage also includes a visual element corresponding to the plurality of configuration types. The system provider device further receives a second selection of a configuration type via the second webpage, the second selection causing rendering of a third webpage displaying a product detail page corresponding to the configuration type. The product detail page also includes the visual element, a configuration summary section, a documents section, and a configuration options panel. The second selection further causes the system provider device to automatically provide an architectural specification accessible via the documents section of the product detail page when the third webpage is rendered.

20 Claims, 15 Drawing Sheets

(56) References Cited

U.S. PATENT DOCUMENTS

| | | | | |
|---|---|---|---|---|
| 9,384,174 | B1 | 7/2016 | Averitt | |
| 11,062,541 | B2 | 7/2021 | Prostko | |
| 2014/0040791 | A1* | 2/2014 | Kim | G06F 8/38<br>715/762 |
| 2019/0018911 | A1* | 1/2019 | Kumar | G06F 30/20 |
| 2024/0354457 | A1* | 10/2024 | Ames | G06F 30/13 |

* cited by examiner

ARCHITECTURAL SPECIFICATION DEVELOPMENT PLATFORM

BACKGROUND

The present disclosure generally relates to a platform for architectural specification development, and more particularly to an intuitive web-based platform for enhancing and simplifying a product specification process for architects, specifiers, and other building industry professionals.

As part of the process of constructing a commercial building, a residential building, a hospital, an airport, a school, or other type of building, plans and specifications are relied upon by architects, engineers, contractors, suppliers, building owners, and other stakeholders for clear communication regarding what is being built and how it will be built. Building plans (also referred to simply as "plans") come in a variety of types (e.g., such as site plans, floor plans, elevation views, etc.) and generally convey information visually by using drawings. Architectural specifications (also referred to as "specifications" or "specs"), on the other hand, provide a detailed written description of how the plans will be implemented. Specifically, the specification describes materials to be used, methods of installation, quality standards, as well as other pertinent information, in order to properly implement the corresponding plans.

In some existing implementations, architects or other specifiers rely on editable specifications or templates provided by manufacturers or suppliers to prepare their own specifications for inclusion in contract documents. In still other examples, specifications from prior projects are modified and reused. These methods may be time-consuming and prone to human error. In addition, previously used specifications or templates may contain out-of-date information. In an attempt to address these challenges, some specification writing software tools have been introduced, but these tools have also been found lacking. In one example, a program including a user interface is provided with no visuals to assist the user who is preparing the specification. In another example, a program including a user interface with static specifications for each of many varieties of a manufacturer's product is provided. Such an implementation requires a user to wade through a lot of information only to pick a particular specification corresponding to a particular product configuration, where the selected specification may then have to still be further edited.

Thus, there is a need for an intuitive web-based platform for enhancing and simplifying a product specification process for architects, specifiers, and other building industry professionals.

Figure 1:
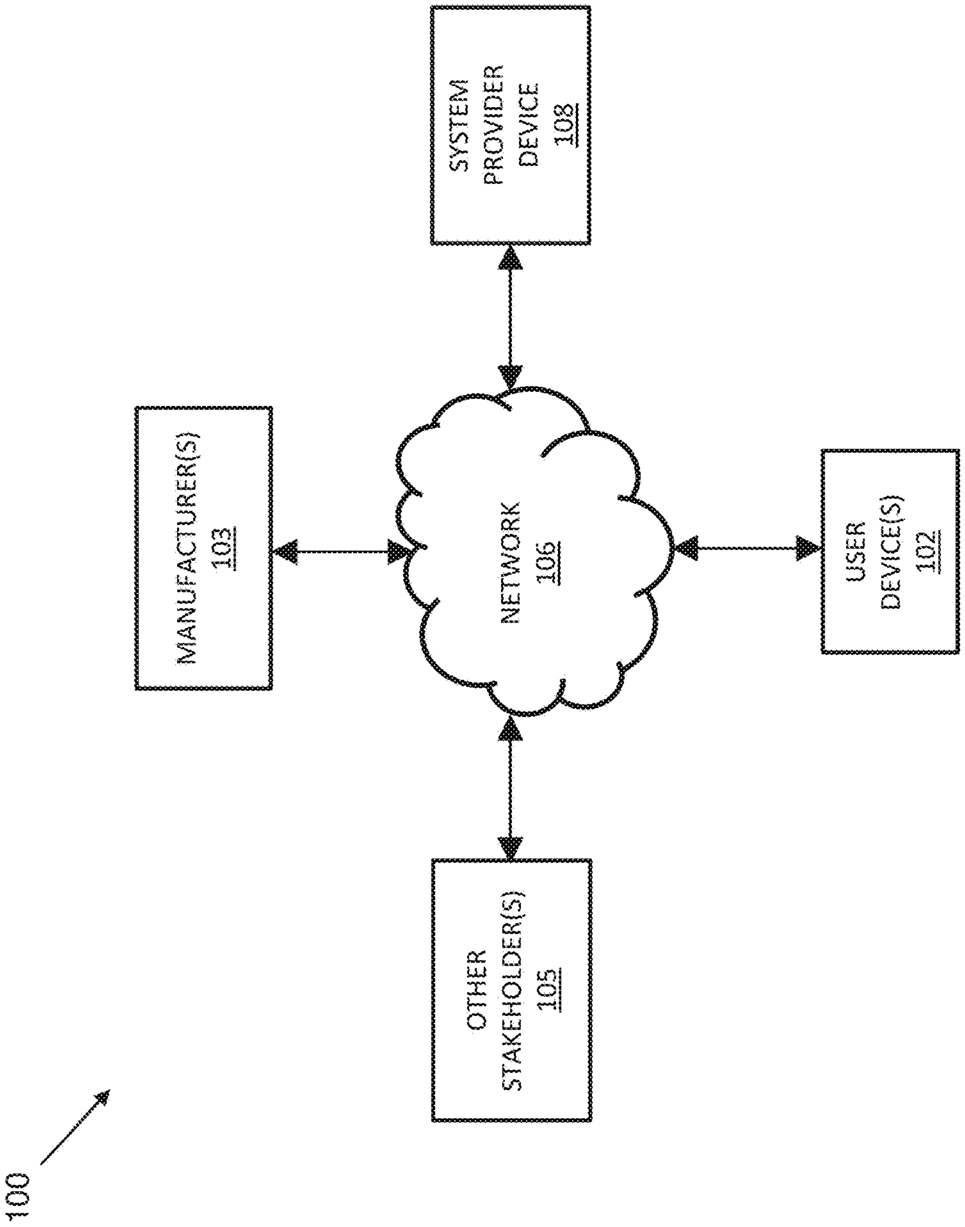
FIG. 1 is a schematic view illustrating a specification development platform, in accordance with some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing an intuitive web-based platform for enhancing and simplifying a product specification process for architects, specifiers, and other building industry professionals. In particular, the present disclosure provides different embodiments, or examples, for implementing different features of the provided subject matter. Specific examples of components and arrangements are described below to simplify the present disclosure. These are, of course, merely examples and are not intended to be limiting.

As previously noted, architectural specifications ("specifications" or "specs") provide a detailed written description of how building plans will be implemented. For instance, the specification describes materials to be used, methods of installation, quality standards, as well as other pertinent information, in order to properly implement the corresponding plans. In some cases, architects or other specifiers may rely on editable specifications or templates provided by manufacturers or suppliers, or they may modify and reuse specifications from prior projects. Such methods can be time-consuming and prone to human error, not to mention previously used specifications or templates may contain out-of-date information. Some specification writing software tools have been introduced in an attempt to address such issues, but these tools have also been found lacking. In one case, a program including a user interface is provided with no visuals to assist the user who is preparing the specification. In another example, a program including a user interface with static specifications for each of many varieties of a manufacturer's product is provided, which itself can also be a time-consuming and error-prone process by requiring a user to wade through a lot of information only to pick a particular specification that may still need to be further modified by the user.

Embodiments of the disclosure offer advantages over the existing art, though it is understood that other embodiments may offer different advantages, not all advantages are necessarily discussed herein, and no particular advantage is required for all embodiments. For example, embodiments discussed herein include systems and methods that provide an intuitive web-based platform (also referred to herein simply as "platform") for enhancing and simplifying a product specification process for architects, specifiers, and other building industry professionals. In some embodiments, the disclosed platform includes an intuitive and interactive interface that provides for dynamic, visually-guided selections of product configuration options that eliminates the need for manual editing of the specification, greatly reduces the need for specialized product knowledge, and virtually eliminates errors. In some examples, the platform provides for automatic delivery of specifications having varying levels of customization including exacting specifications, semi-customized specifications, and generic specifications. By way of example, an exacting specification provides for all editable product configurations options to be selected by a specifier via the platform, a semi-customized specification provides a selection of the most commonly used configuration options, and a generic specification provides a basic template specification (e.g., such as provided by a product manufacturer) for the architect or specifier to edit manually. In an embodiment, the platform may combine fixed template portions with dynamically selected portions to provide industry standard 3-part specifications. The platform further includes logic to dynamically ensure compatibility of selected product configuration options, availability of products and particular configuration options (e.g., via communication with manufacturers and/or suppliers), compliance with applicable codes, and conformance with changes to project requirements. In various embodiments, the platform also integrates guidelines, articles, and other product knowledge to assist architects and/or specifiers in making informed decisions. The disclosed platform also provides tools for project management and collaboration to streamline workflows. Various other embodiments and advantages of the present disclosure will become evident in the discussion that follows and with reference to the accompanying figures.

Referring now to FIG. 1, an embodiment of a specification development platform 100 is illustrated. The specification development platform 100 includes a user device 102 operated by a user. In various embodiments, the user device 102 may include any type of computing device such as a laptop, a desktop, a mobile device, or other appropriate computing device operated by any type of user. However, for purposes of this discussion, the user operating the user device 102 may generally include an architect, an engineer, a designer, or any other individual engaged as a specifier (specification writer). While the embodiments herein are generally shown and described with reference to a single user device (e.g., user device 102) operated by a single user for the sake of clarity, it will be understood that various embodiments may include a plurality of user devices operated by a plurality of users (including other specifiers or other project stakeholders such as owners, project managers, contractors, subcontractors, manufacturers, suppliers, distributors, etc.) at a plurality of user physical locations. In various examples, the user device 102 is coupled to a network 106 that is further coupled to a system provider device 108, which may include one or more system provider servers. In an example, the user device 102 and the system provider device 108 are configured to communicate with one another by way of the network 106, for example by way of network communication devices, as discussed below.

The specification development platform 100 may also include a manufacturer 103. In various embodiments, the manufacturer 103 may include a manufacturer operating a physical manufacturer location, a corresponding physical retail location, and/or a corresponding virtual storefront accessible to a user via a website (e.g., accessible through an Internet connection using a mobile device and/or a personal computer) or via a mobile application executing on the user's mobile device. It will be understood that various embodiments may include a single manufacturer at a single physical location, a plurality of manufacturers at a plurality of physical locations, a single manufacturer having a plurality of physical locations, a plurality of manufacturers operating a plurality of virtual storefronts, and/or a single manufacturer operating a plurality of virtual storefronts. In various examples, the manufacturer 103 includes one or more manufacturer devices that are coupled to the network 106 that is further coupled to a system provider device 108. For example, the manufacturer 103 and the system provider device 108 are configured to communicate with one another by way of the network 106, for example by way of network communication devices, as discussed below. In addition to supplying building materials and products to meet a project's functional, aesthetic, and performance requirements, the manufacturer 103 may be relied upon to provide product and technical information, articles, guidelines, updates, as well as other resources to assist specifiers and/or other project stakeholders in the decision-making process.

The specification development platform 100 may also include other stakeholders 105. In various embodiments, the other stakeholders 105 may include owners, project managers, contractors, subcontractors, suppliers, distributors, regulatory bodies, and local authorities. In various examples, the other stakeholders 105 include one or more devices that are coupled to the network 106 that is further coupled to the system provider device 108 and the manufacturer 103. For example, the other stakeholders 105 and the manufacturer 103, as well as the other stakeholders 105 and the system provider device 108, are configured to communicate with one another by way of the network 106, for example by way of network communication devices, as discussed below. In some embodiments, the other stakeholders 105 may be relied upon to provide a host of information to further assist specifiers and/or other project stakeholders in the decision-making process. For example, owners and/or project managers may provide information related to project scope, budget, schedule, etc.; contractors, subcontractors, suppliers, and distributors may provide information related to procurement of materials and/or products; and regulatory bodies and local authorities may provide information related to local laws, regulations, building codes, environmental requirements, safety requirements, zoning bylaws, inspections, permits, licenses, etc.

The network 106 may be implemented as a single network or a combination of multiple networks. For example, in various embodiments, the network 106 may include the Internet and/or one or more intranets, landline networks, wireless networks, cellular networks, satellite networks, and/or other appropriate types of networks. In some examples, the user device 102 may communicate through the network 106 via cellular communication, by way of one or more user network communication devices. In other examples, the user device 102 may communicate through the network 106 via wireless communication (e.g., via a WiFi network), by way of one or more user network communication devices. In yet other examples, the user device 102 may communicate through the network 106 via any of a plurality of other radio and/or telecommunications protocols, by way of one or more user network communication devices. In still other embodiments, the user device 102 may communicate through the network 106 using a Short Message Service (SMS)-based text message, by way of one or more user network communication devices.

The system provider device 108 may likewise couple to the network 106 via a wired or wireless connection. As described in more detail below with reference to FIG. 15, the system provider device 108 may include a specification engine, a communication engine, a user database, and a system provider database. Software or instructions stored on a computer-readable medium, and executed by one or more processors of the system provider device 108, allows the system provider device 108 to send and receive information over the network 106. Furthermore, the specification engine in the system provider device 108 may be configured to implement the various embodiments of the specification development platform 100 as described herein. In addition, while the embodiment of FIG. 1 illustrates the specification development platform 100 deployed in a client-server operating environment, it is to be understood that other suitable operating environments and/or architectures may be used in accordance with the described embodiments. For instance, the specification development platform 100 may be deployed as part of a microservices architecture, in accordance with some embodiments. Further, in some cases, the system provider device 108 may be deployed as a local or remote server. In some embodiments, the specification development platform 100 may be deployed as a software-as-a-service (SaaS) platform.

In some examples, the system provider device 108 is configured to provide a web-based platform for streamlining the product specification process. As previously noted, the disclosed platform, provided by the system provider device 108, includes an intuitive and interactive interface that provides for dynamic, visually-guided selections of product configuration options that eliminates the need for manual editing of the specification, greatly reduces the need for specialized product knowledge, and virtually eliminates errors. In addition, and among other features, the system provider device 108 provides the web-based platform for automatic delivery of specifications having varying levels of customization including exacting specifications, semi-customized specifications, and generic specifications. In various embodiments, the system provider device 108 may provide access to the web-based platform via a manufacturer's website (e.g., such as a website of the manufacturer 103). To be sure, in other examples, the system provider device 108 may provide access to the web-based platform via a stand-alone website (that is in communication with one or more manufacturers 103 and/or other stakeholders 105), or via a website of one or more of the other stakeholders 105. Regardless of how access to the platform is provided, the system provider device 108 may be configured to maintain regular and real-time communication between the manufacturer 103, the other stakeholders 105, and the user device 102, in order to provide accurate, consistent, and up-to-date information to assist specifiers and/or other project stakeholders and streamline workflows.

In addition, in some embodiments, the system provider (e.g., operating the system provider device 108) may include a manufacturer (e.g., such as the manufacturer 103) that provides the specification development platform 100 for a user operating the user device 102, as well as any other users implementing the specification development platform 100. Information sent and received through the network 106 and user devices 102 may be associated with user accounts in a database located in a non-transitory memory, and any use of that information may be stored in association with such user accounts. Furthermore, the manufacturer may provide the specification development platform 100 for a plurality of different users, similarly as described for a user operating the user device 102, discussed below. Thus, references to a system provider operating a system provider device below may refer to a manufacturer operating a system provider device or may refer to any other entity providing a specification development platform separate from or in cooperation with a manufacturer (e.g., such as one of the other stakeholders).

Figure 2:
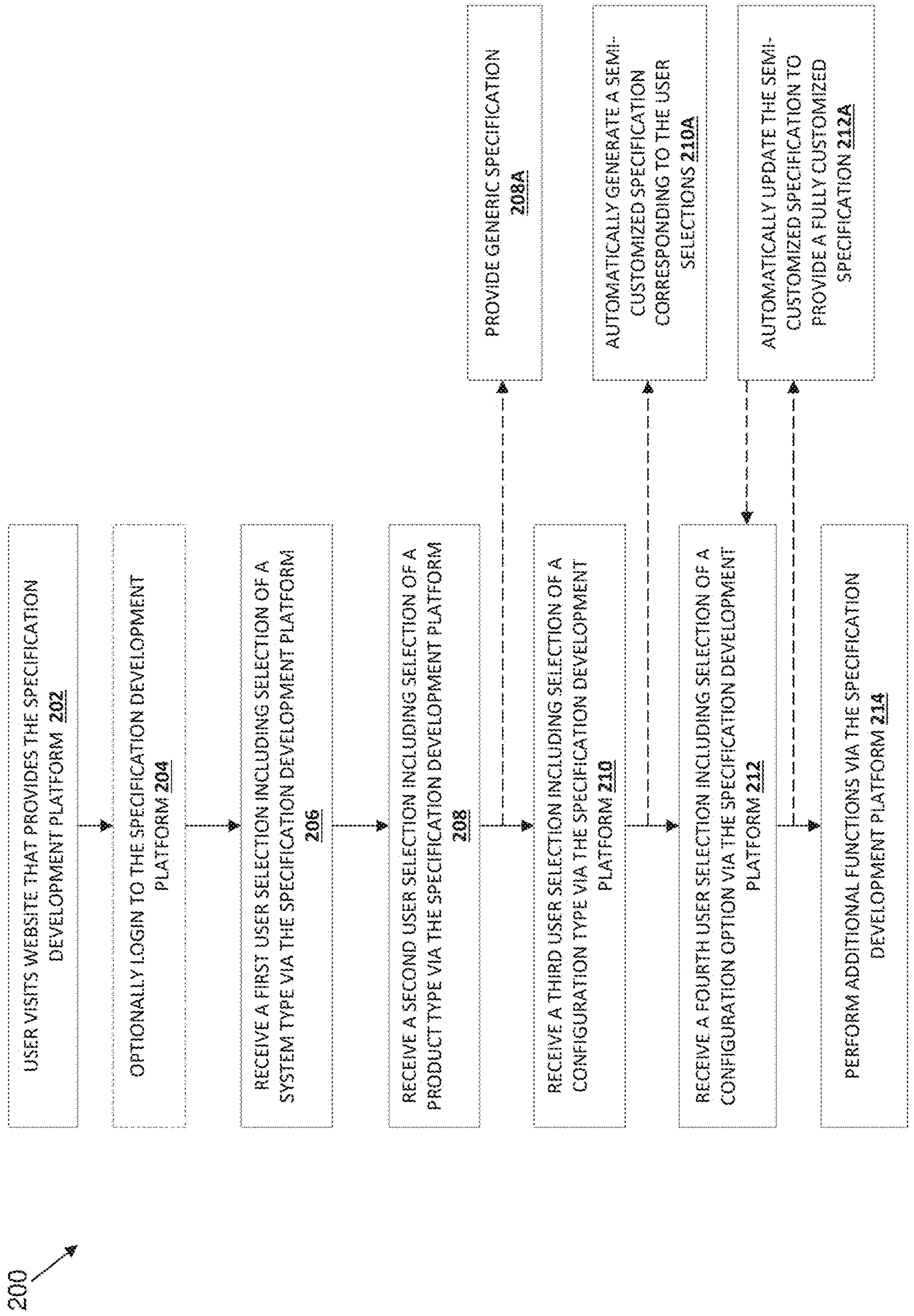
FIG. 2 is a flow chart illustrating an embodiment of a method for providing a specification development platform for enhancing and simplifying a product specification process, in accordance with some embodiments.
Figure 3:
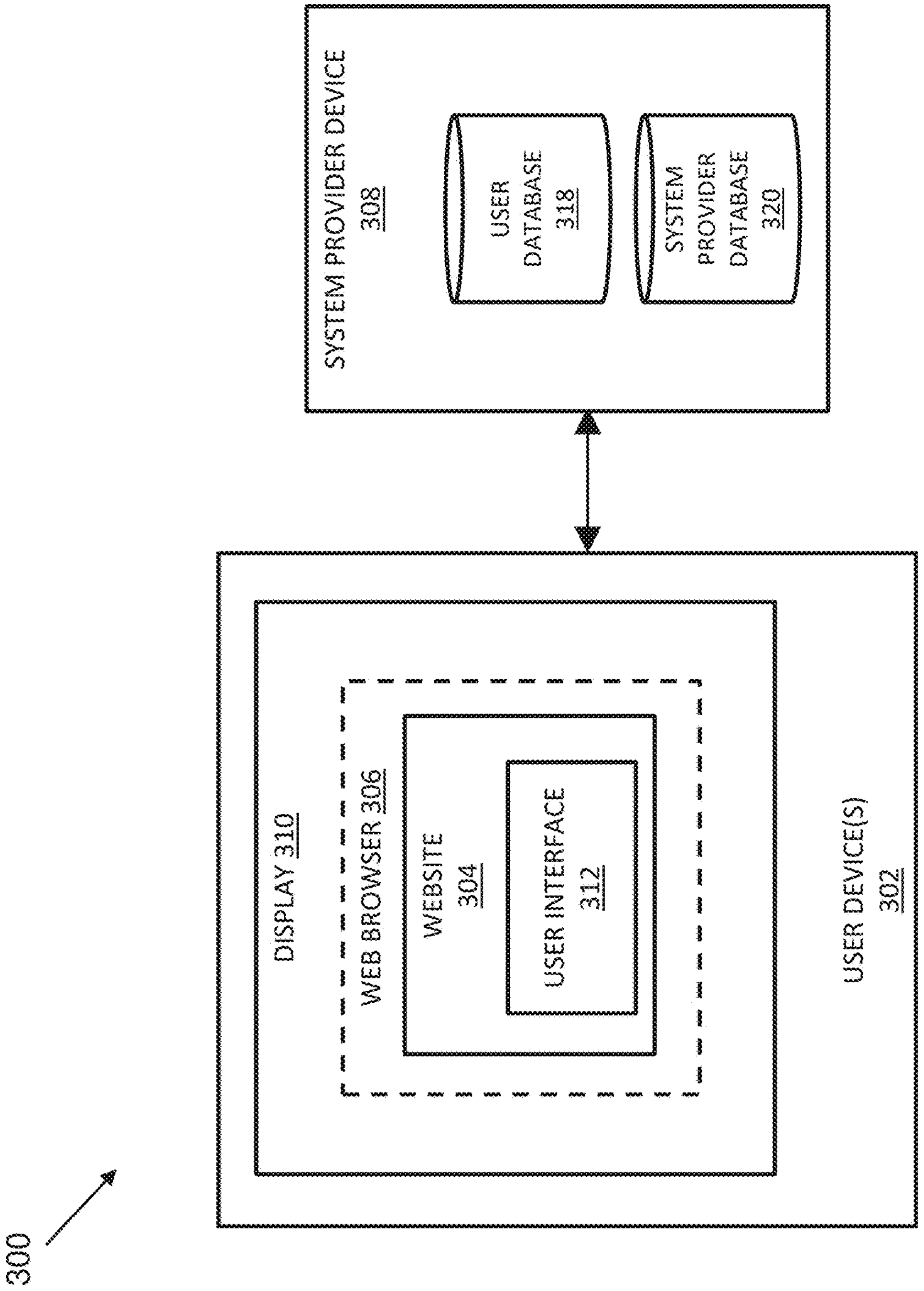
FIG. 3 illustrates an interface between a user device and a system provider device, in accordance with some embodiments.

Referring now to FIG. 2, an embodiment of a method 200 for providing a specification development platform for enhancing and simplifying a product specification process is illustrated. While some steps of the method 200 may involve direct user input (e.g., user selection of a system type, a product type, a configuration type, a configuration option, etc.), all of the functionality provided by the specification development platform 100 may not necessarily be visible to the user of the specification development platform 100. One of skill in the art in possession of the present disclosure will recognize that the method 200 may be performed for a plurality of different users operating a variety of different user devices at a variety of physical locations. It will also be understood that additional steps may be performed before, during, and/or after the steps described below with reference to the method 200. In particular, with reference to FIGS. 3-12, various aspects of the method 200 are illustrated and described.

The method 200 begins at block 202 where a user visits a website (e.g., such as a manufacturer's website, in some examples) that provides access to the specification development platform 100. For example, with reference to FIG. 3 and in an embodiment of block 202, a user operating a user device 302, which may include the user device 102 discussed above, may access a particular website 304 (e.g., such as a manufacturer's website, in some examples) using a web browser 306 executing on the user device 302. The web browser 306 will render the particular website 304 via a display 310 of the user device 302. In some examples, the website 304 includes a user interface 312 that provides user-access to the specification development platform 100. In particular, access to the specification development platform 100 via the user device 302 is provided, at least in part, by communication between the user interface 312 and a system provider device 308, which may be the system provider device 108 discussed above. In some embodiments, communication between the user interface 312 and the system provider device 308 may be provided using one or more application programming interface (API) clients and gateways communicating over a network (e.g., such as the network 106). The user interface 312 is described in more detail below with reference to FIGS. 4-12. In various embodiments, the system provider device 308 may include a user database 318 and/or a system provider database 320. In various examples, the user database 318 and/or the system provider database 320 may store user account information, project information (e.g., such as scope, budget, schedule, etc.), manufacturer information (e.g., such as product information, technical information, inventory status, articles, guidelines, etc.), and/or other stakeholder information (e.g., such as information related to procurement of materials and/or products, information related to local laws, regulations, building codes, environmental requirements, safety requirements, zoning bylaws, inspections, permits, licenses, etc.), among other information.

The method 200 may optionally proceed to block 204, where a user may login to the specification development platform 100, or the user may create a specification development platform account and login, if so desired. While logging into the specification development platform 100 is not necessary for the user to access a majority of the functionality of the specification development platform 100, logging in may provide some additional options. For example, by logging in and as discussed in more detail below with reference to FIGS. 9-12, the user may have the option to save project files (e.g., such as in the user database 318 and/or the system provider database 320) for any number of projects that include project details such as project address, number, ship date, notes, budget, size, owner type, phase, etc. In addition, products chosen for a particular project may be saved to the project files, as well as files associated with products included within the particular project.

Figure 4:
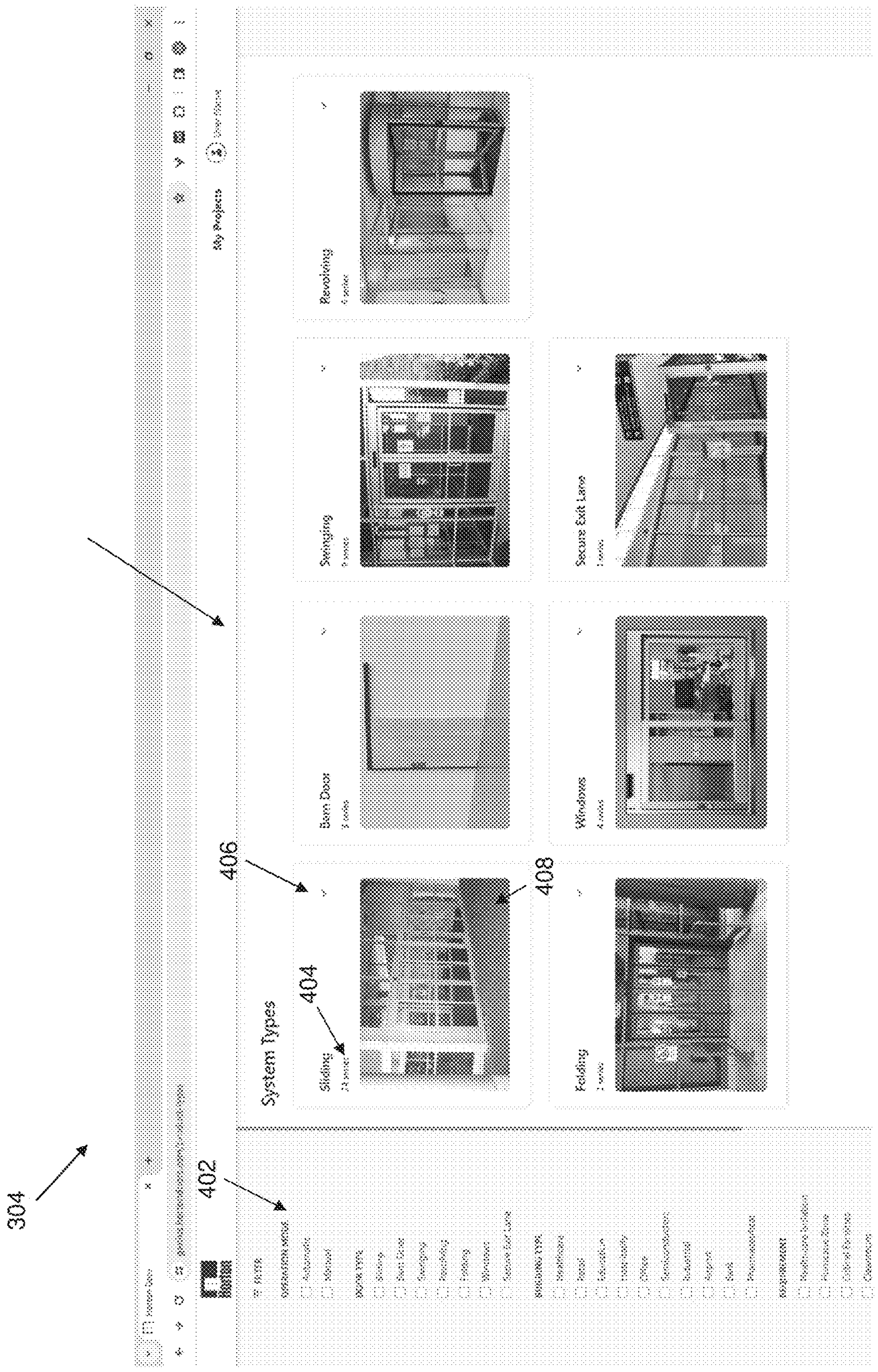
FIGS. 4, 5, 6, 7, 8, 9, 10, 11, and 12 illustrate embodiments of a user interface that provides user-access to the specification development platform, in accordance with some embodiments.

The method 200 proceeds to block 206 where a first user selection of a system type is received. With reference to FIG. 4, illustrated therein is an embodiment of a first webpage of a website (e.g., such as the website 304) displayed in a window of a web browser (e.g., such as the web browser 306). As shown, the website 304 includes the user interface 312 that provides user-access to the specification development platform 100, as described above. While not limited thereto, for purposes of the discussion that follows, it will be assumed that the website 304, and the associated user interface 312, correspond to a door manufacturer such as Horton Automatics™, a division of Overhead Door Corporation of Lewisville, TX. To be sure, in other embodiments, the website and associated user interface may correspond to any of a variety of other types of manufacturers and/or stakeholders (e.g., such as the manufacturers 103 and/or the stakeholders 105), as previously indicated. In the example shown, the user interface 312 displays a plurality of system types including sliding doors, barn doors, swinging doors, revolving doors, folding doors, transaction windows, and secure exit lanes (SELs). Each of the plurality of system types may come in one or more of a plurality of product types (or series), for example, as indicated by text 404 immediately beneath the name of each system type of the plurality of system types. Moreover, each of the plurality of system types has a corresponding visual element 408 which may be used to visualize the particular system type for the user. In various embodiments, each of the visual elements 408 may include a static image, an animatable image (e.g., an image that is animated upon hovering a mouse pointer over the animatable image, in some cases implemented using a CSS hover animation), a video, or other visual element.

In various examples, the user interface 312 may include an option to filter and/or refine the system types shown in the user interface 312. In some cases, this feature may be provided by a filter options panel 402, as shown in FIG. 4. In some embodiments, the filter options panel 402 may provide for filtering and/or refining the system types shown according to any of a variety of parameters such as operation mode, door type, building type, requirement, or any other appropriate filter. By way of example, the operation mode options may include automatic or manual; the door type options may include sliding, barn door, swinging, revolving, folding, transaction windows, or SELs; the building type options may include healthcare, retail, education, hospitality, office, semiconductors, industrial, airport, bank, or pharmaceutical; and the requirement options may include healthcare isolation, hurricane zone, critical facilities, cleanroom, swing ADA (low energy), swing full power, swing fire rated, ballistic/blast, security, or control access. Thus, while the system provider (e.g., such as the system provider device 308) may have initially provided more system types visible via the user interface 312, the user may filter the system types shown by activating one or more of the filters available in the filter options panel 402. For instance, if the user activates the automatic operation mode filter, only the system types that include product types (or series) with automatic operation will be displayed via the user interface 312 and the corresponding text 404 will be updated accordingly. In another example, if the user activates the revolving door type option, only the revolving door system type will be displayed via the user interface 312 and the corresponding text 404 will be updated accordingly. In another case, if the user activates the ballistic/blast filter, only the system types that include product types (or series) with ballistic/blast features will be displayed via the user interface 312 and the corresponding text 404 will be updated accordingly. While some examples of filtering and/or refining the system types shown according to a variety of parameters have been provided, those skilled in the art in possession of the present disclosure will recognize other filtering and/or refining options that may equally be implemented, while remaining within the scope of the present disclosure.

Figure 5:
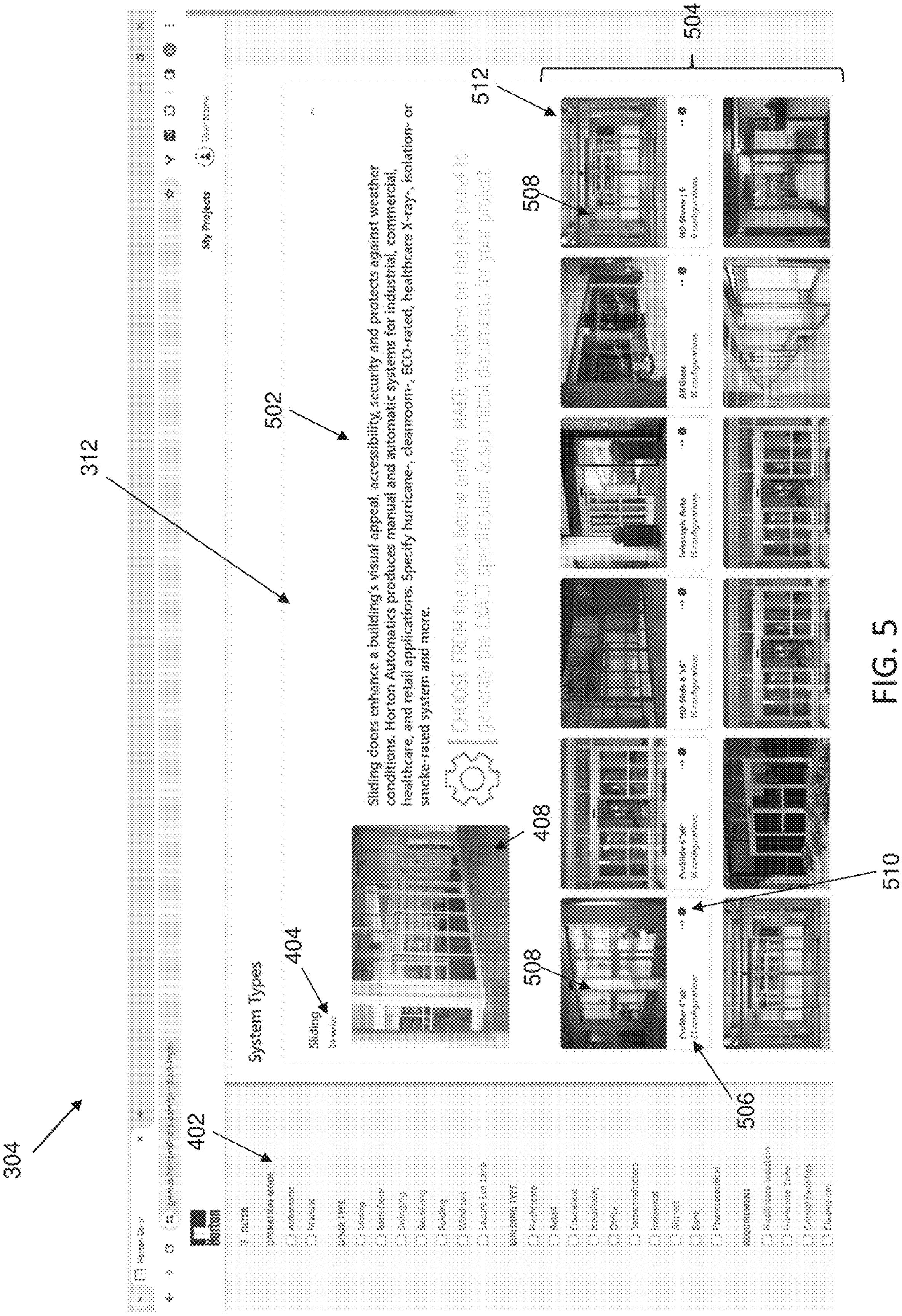

Elaborating on the example of FIG. 4 and in an embodiment of block 206, consider an example where the user would like to select a particular system type, such as the sliding door system type, and view the available product types (or series) for the given system type. In such a case, the user may select the system type (e.g., such as the sliding door system type) by clicking on the visual element 408 or on a drop-down icon 406 corresponding to the sliding door system type. The user selection of the particular system type may be communicated to, and received by, the system provider device 308 over the network 106. As a result of receiving the user selection of the particular system type, the system provider device 308 may cause the user interface 312 to display a more detailed view of the particular system type selected (e.g., such as the sliding door system type), as shown in FIG. 5. In various embodiments, the system provider device 308 may cause the more detailed view of the particular system type to be displayed within the same or different webpage of the website 304. In the example of FIG. 5, the more detailed view of the sliding door system type includes the visual element 408 corresponding to the sliding door system type, a general description 502 of sliding door systems, and an expanded view 504 of each of the product types (or series) available for the sliding door system type. As shown in the expanded view 504, each of the plurality of product types (or series) available for the sliding door system type may come in one or more of a plurality of configurations, for example, as indicated by text 506 immediately beneath the name of each of the plurality of product types (or series). In some embodiments, each of the plurality of product types (or series) has a corresponding visual element 508 which may be used to visualize the particular product types (or series) for the user. Each of the visual elements 508, similar to the description given above with reference to FIG. 4, may include a static image, an animatable image (e.g., an image that is animated upon hovering a mouse pointer over the animatable image, in some cases implemented using a CSS hover animation), a video, or other visual element.

Figure 6:
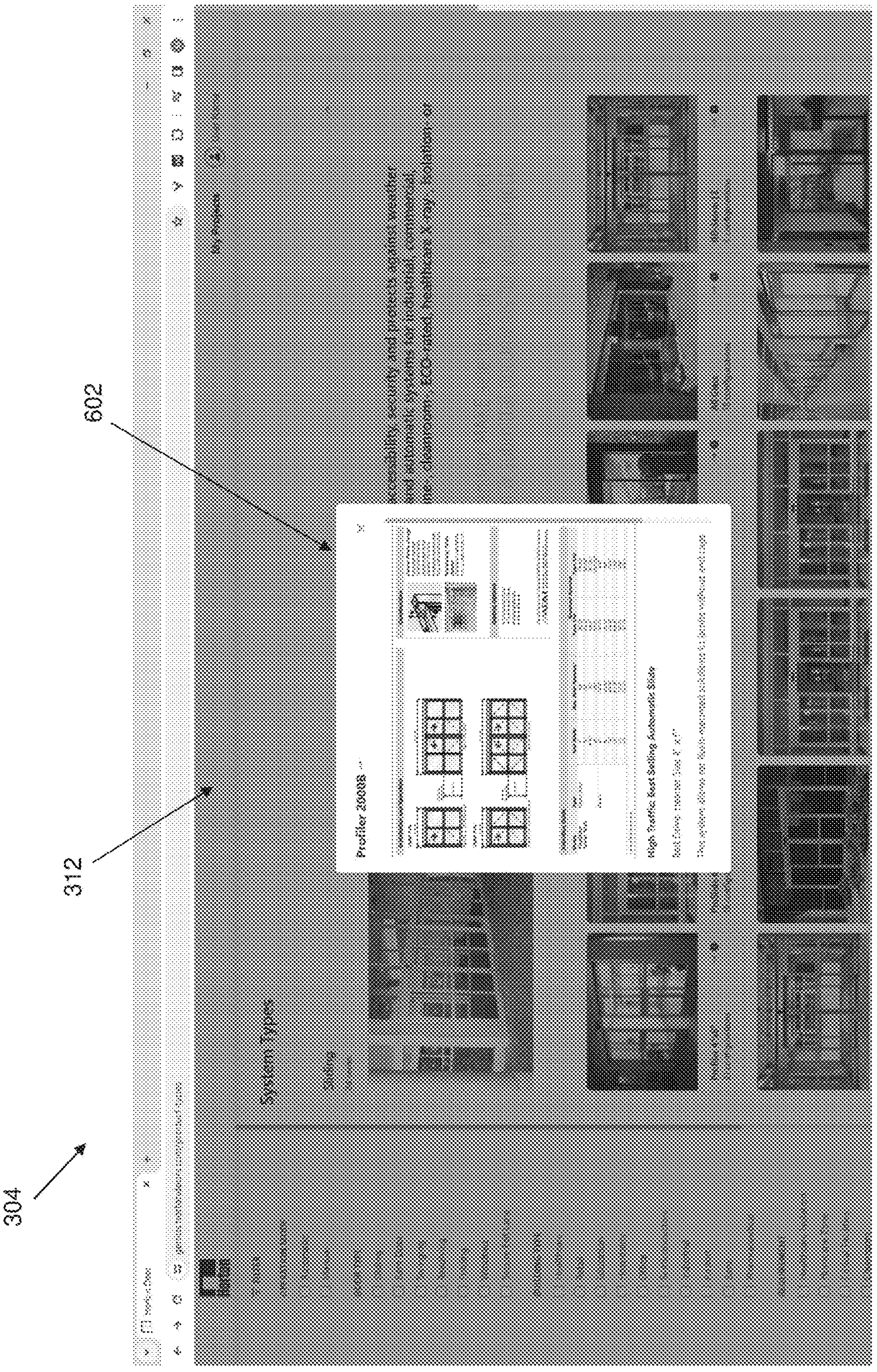

The user interface 312, as shown in FIG. 5, may still include the filter options panel 402. Similar to the above discussion, but with reference to FIG. 5, if the user activates the automatic operation mode filter, only the product types (or series) available for the sliding door system type that include automatic operation will be displayed via the user interface 312 and the corresponding text 404 (and possibly the corresponding text 506) will be updated accordingly. In another example, if the user activates the ballistic/blast filter, only the product types (or series) available for the sliding door system type that include ballistic/blast features will be displayed via the user interface 312 and the corresponding text 404 (and possibly the corresponding text 506) will be updated accordingly. In addition, and as also shown in the user interface 312, each of the plurality of product types (or series) has a corresponding informational icon 510, which the user may click on to learn more about the corresponding product type (or series). For example, clicking on the informational icon 510 for a particular product type may cause a pop-up window 602 to be displayed over the user interface 312, as shown in FIG. 6. The pop-up window 602 may provide a variety of different types of visual and/or textual information such as features, applications, configuration options, installation and operation information, construction information, selection guide, photographs, drawings (e.g., including architectural drawings), or any other information that may be useful to the user.

Figure 7:
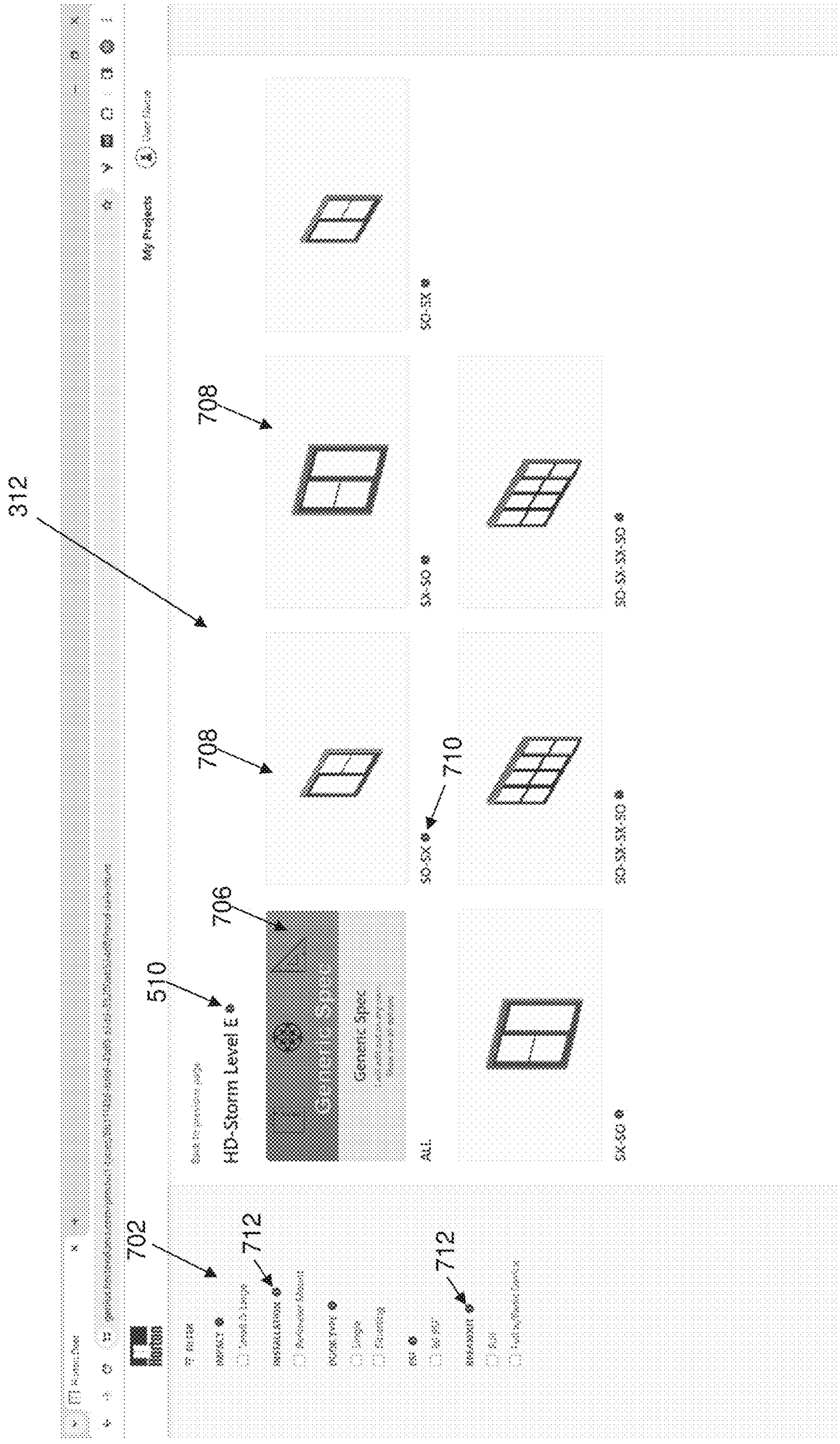

The method 200 proceeds to block 208 where a second user selection of a product type is received. With reference to FIG. 5 and FIG. 7, in an embodiment of block 208, consider an example where the user would like to select a particular product type (or series type), such as for example an HD-Storm type Level E product type 512, and view the available product configurations for the selected particular product types (or series). In such a case, the user may select the product type (e.g., such as the HD-Storm type Level E product type 512) by clicking on the visual element 508 corresponding to the HD-Storm type Level E product type 512. The user selection of the particular product type may be communicated to, and received by, the system provider device 308 over the network 106. As a result of receiving the user selection of the particular product type, the system provider device 308 may cause the user interface 312 to display a plurality of configuration types (e.g., such as SO-SX, SX-SO, SO-SX-SX-SO, etc.) corresponding to the selected particular product type (e.g., the HD-Storm type Level E product type 512, in this example), as shown in FIG. 7. In some embodiments, the system provider device 308 may cause the plurality of configuration types corresponding to the selected particular product type to be displayed within a different webpage of the website 304. As shown in the example of FIG. 7, each of the plurality of configuration types corresponding to the selected particular product type has a corresponding visual element 708 which may be used to visualize the particular configuration types for the user. In some embodiments, the visual elements 708 corresponding to each of the plurality of configuration types include an animatable image (e.g., an image that is animated upon hovering a mouse pointer over the animatable image, in some cases implemented using a CSS hover animation). In other examples, the visual elements 708 include a static image, a video, or other visual element. In addition, and as also shown in the user interface 312 of FIG. 7, each of the plurality of configuration types has a corresponding informational icon 710, which the user may click on to learn more about the corresponding configuration type. For example, clicking on the informational icon 710 for a particular configuration type may cause a pop-up window to be displayed over the user interface 312, similar to the pop-up window described above with reference to FIG. 6. In various embodiments, the pop-up window provided by clicking on the informational icon 710 may thus similarly provide a variety of different types of visual and/or textual information such as features, applications, configuration options, installation and operation information, construction information, selection guide, photographs, drawings (e.g., including architectural drawings), or any other information that may be useful to the user.

The user interface 312, as shown in FIG. 7, may include an option to filter and/or refine the plurality of configuration types shown in the user interface 312. In some cases, this feature may be provided by a filter options panel 702, as shown in FIG. 7. In some embodiments, the filter options panel 702 may provide for filtering and/or refining the configuration types shown according to any of a variety of parameters such as impact resistance, installation method, door type (e.g., such as single, biparting, telescoping, etc.), PSF rating (e.g., pounds per square foot of wind pressure that the door can resist without failing), breakout option, or any other appropriate filter. Thus, while the system provider (e.g., such as the system provider device 308) may have initially provided more configuration types visible via the user interface 312, the user may filter the configuration types shown by activating one or more of the filters available in the filter options panel 702. For instance, if the user activates the biparting door type filter, only the configuration types corresponding to the selected particular product type (e.g., the HD-Storm type Level E product type 512, in this example) that include biparting door types will be displayed via the user interface 312. In another example, if the user activates the full breakout option, only the configuration types corresponding to the selected particular product type (e.g., the HD-Storm type Level E product type 512, in this example) that include the full breakout option will be displayed via the user interface 312. It is also noted that the user interface 312 of FIG. 7 may include informational icons 712, which the user may click on to enable a pop-up window that will provide more information (e.g., visual and/or textual information) about the configuration type filters provided in the filter options panel 702. While some examples of filtering and/or refining the configuration types shown according to a variety of parameters have been provided, those skilled in the art in possession of the present disclosure will recognize other filtering and/or refining options that may equally be implemented, while remaining within the scope of the present disclosure. For instance, depending on the system type selected (at block 206) and the product type selected (at block 208), the available product configurations available and displayed via the user interface 312 may vary.

Responsive to receiving the second user selection of the product type (block 208), the method 200 may in tandem perform the step of block 208A to provide a generic specification via the user interface 312 of FIG. 7. In an example, a link 706 to a generic 3-part specification may be provided via the user interface 312, where the generic specification corresponds to the selected particular product type (e.g., the HD-Storm type Level E product type 512, in this example). In some embodiments, the generic specification is a fully-editable document that may include every configuration type and configuration option associated with the selected particular product type (e.g., the HD-Storm type Level E product type 512, in this example). In other embodiments, the generic specification includes a selection of the most common configuration types and configuration options associated with the selected particular product type (e.g., the HD-Storm type Level E product type 512, in this example). In an example, the user may download the generic specification by clicking on the link 706, and the user may manually edit the generic specification by removing unnecessary configuration types and/or configuration options, or otherwise edit the various configuration types and options provided in the generic specification as needed or desired.

Figure 8:
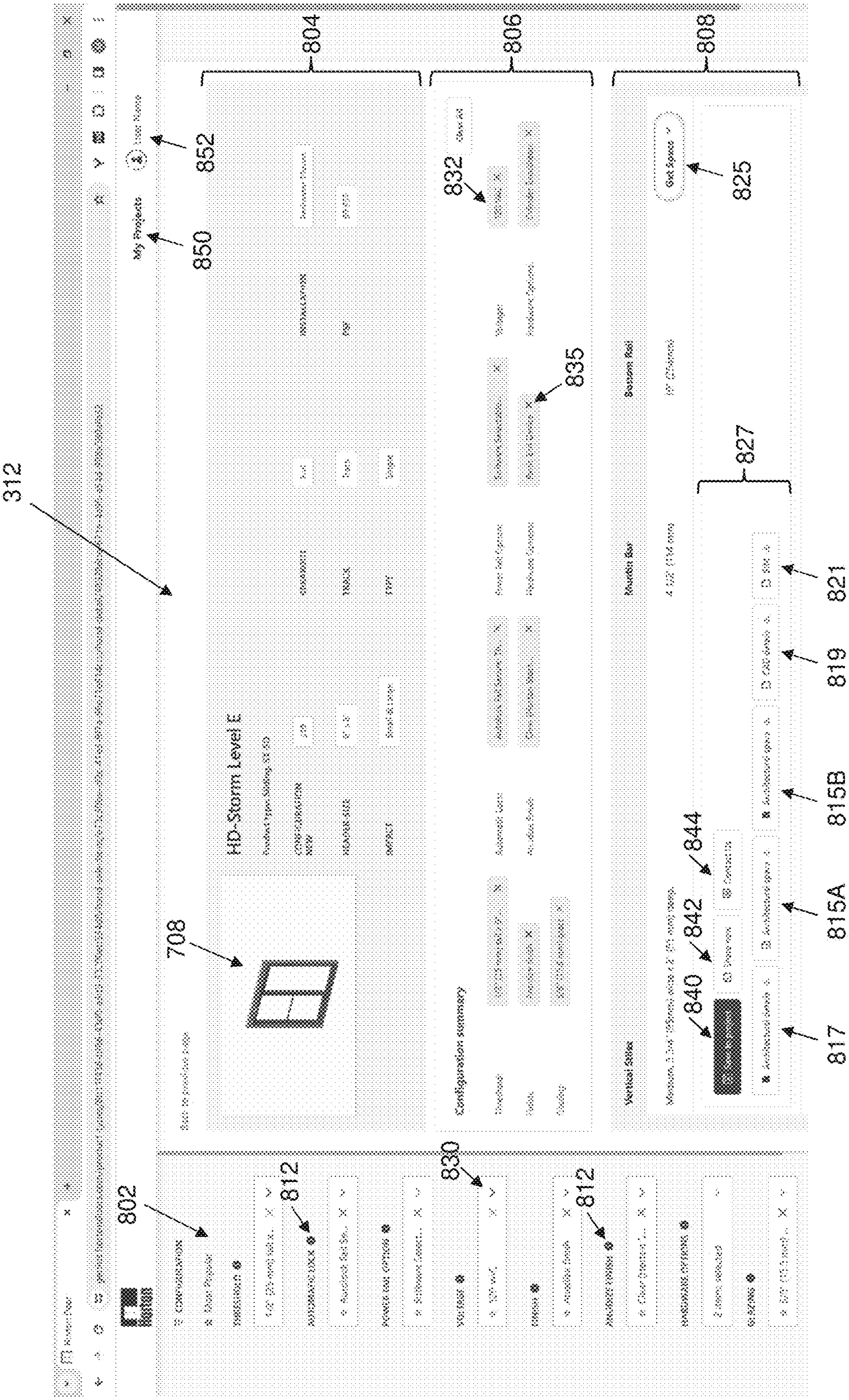

The method 200 proceeds to block 210 where a third user selection of a configuration type is received. With reference to FIG. 7 and FIG. 8, in an embodiment of block 210, consider an example where the user would like to select a particular configuration type, such as for example an SX-SO configuration type, and view the available configuration options for the selected particular configuration type. In such a case, the user may select the configuration type (e.g., such as the SX-SO configuration type) by clicking on the visual element 708 corresponding to the SX-SO configuration type. The user selection of the particular configuration type may be communicated to, and received by, the system provider device 308 over the network 106. As a result of receiving the user selection of the particular configuration type, the system provider device 308 may cause the user interface 312 to display a product detail page corresponding to the selected particular configuration type (e.g., the SX-SO configuration type, in this example) of the selected particular product type (e.g., the HD-Storm type Level E product type 512), as shown in FIG. 8. In some embodiments, the system provider device 308 may cause the product detail page to be displayed within a different webpage of the website 304. As shown in the example of FIG. 8, the product detail page includes the visual element 708 corresponding to the selected particular configuration type. As discussed above, and in various embodiments, the visual element 708 may include an animatable image, a static image, a video, or other visual element.

In addition, and as also shown in the product detail page of FIG. 8, the user interface 312 may include a configuration options panel 802, a configuration type section 804, a configuration options summary section 806 (or simply a configuration summary section 806), and a documents section 808. By way of example, the configuration type section 804 may correspond to user selections made in the prior webpage of the website 304 (e.g., selections corresponding to the configuration type which were made in the user interface 312 of FIG. 7). In various embodiments, the configuration summary section 806 may correspond to selections made via the configuration options panel 802. In some embodiments, the configuration options panel 802 may provide for selecting and/or modifying various configuration options (e.g., via a plurality of respective drop-down menus) for the product displayed in the product detail page of FIG. 8. Thus, in the present example, the configuration options panel 802 may provide for selecting and/or modifying various configuration options for the selected particular configuration type (e.g., the SX-SO configuration type) of the selected particular product type (e.g., the HD-Storm type Level E product type 512). In some examples, the configurations options available for selection and/or modification, using the configuration options panel 802, include threshold options, automatic lock options, power fail options, voltage options, finish options, hardware options, and glazing options, among others. While some examples of configurations options available for selection and/or modification via the configuration options panel 802 have been provided, those skilled in the art in possession of the present disclosure will recognize other configuration options that may equally be implemented, while remaining within the scope of the present disclosure. For instance, it will be understood that depending on the system type selected (at block 206), the product type selected (at block 208), and the configuration type selected (at block 210), the configurations options available for selection and/or modification via the configuration options panel 802 may vary.

Further, in some embodiments, such as when the user interface 312 of FIG. 8 (the product detail page) is initially rendered, the system provider device 308 may cause the configuration options panel 802 to default to a set of most popular (or most common) configuration options. As shown in the present example, and in some embodiments, the most popular (or most common) selection (or parameter value) for a given configuration option may be indicated by the use of a star symbol (☆) next to the respective selection (or parameter value) for the given configuration option. In other example, a different symbol may be used to indicate the most popular (or most common) selection (or parameter value). Further, in cases where there is only one available selection (or parameter value) for a given configuration option, there may not be a symbol used to indicate the most popular (or most common) selection (or parameter value). It is also noted that the user interface 312 of FIG. 8 (e.g., the configuration options panel 802) may include informational icons 812, which the user may click on to enable a pop-up window that will provide more information (e.g., visual and/or textual information) about respective ones of the configuration options provided in the configuration options panel 802.

Responsive to receiving the third user selection of the configuration type (block 210), the method 200 may in tandem perform the step of block 210A to automatically provide, by the system provider device 308, a semi-customized specification (without additional user input or feedback) via the documents section 808 of the user interface 312 of FIG. 8 (the product detail page). For avoidance of doubt, button 825 with the label 'Get Specs' need not be clicked to generate the semi-customized specification. Instead, the button 825 may be merely used to expand or collapse a portion 827 of the documents section 808 of the user interface 312 to either hide or view the portion 827. As noted, the semi-customized specification is automatically provided, without additional user input or feedback, via the documents section 808 and in response to receiving the third user selection of the configuration type. In an example, multiple links 815A, 815B to a semi-customized 3-part specification may be provided, where each link provides access to the semi-customized specification in a different document format (e.g., PDF, DOC, DOCX, etc.). In various embodiments, the semi-customized specification corresponds to the default set of the most popular (or most common) configuration options for the selected particular configuration type (e.g., the SX-SO configuration type) of the selected particular product type (e.g., the HD-Storm type Level E product type 512, in this example). In some embodiments, the semi-customized specification provided via the links 815A, 815B may include a fixed template portion and a dynamic portion. The fixed template portion of the specification may include aspects of the specification that may generally not change for a given manufacturer and/or aspects that are otherwise non-editable by the user. To be sure, upon downloading the specification, the user may nevertheless choose to edit the fixed template portions of the specification, as the semi-customized specification is also fully editable. The dynamic portion of the specification may include those options that are user-selectable via the user interface 312 of the specification development platform 100. For example, the dynamic portion of the specification may include the default set of the most popular (or most common) configuration options for the selected particular configuration type of the selected particular product type. More generally, the dynamic portions of the specification may include information related to system types, product types, configuration types, configuration options, project information (e.g., such as project address, number, ship date, notes, budget, size, owner type, phase, etc.), as well as other information that may be subject to change.

Further in response to receiving the third user selection of the configuration type (block 210), and in a further embodiment of block 210A, the system provider device 308 may provide access to other relevant files via the documents section 808 of the user interface 312 of FIG. 8 (the product detail page). For example, a link 817 to an architectural details document may be provided. In an embodiment, the architectural details document may include architectural details associated with the particular product type selected (e.g., the HD-Storm type Level E product type 512, in this example) such as standard package configurations, installation and operation instructions, available options, compliance information, elevation and floor plan views, section views, as well as other pertinent architectural details. In addition, links 819, 821 to one or more computer-aided design (CAD) files and building information modeling (BIM) files, which may be provided in a variety of file formats such as DWG, DXF, DST, RFA, RVT, IFC, NWD, and the like. In an embodiment, the CAD and BIM files may include information associated with the particular product type selected (e.g., the HD-Storm type Level E product type 512, in this example).

In various embodiments, the portion 827 of the documents section 808 of the user interface 312 may further include a 'Save to project' button 840 to save the selected product (e.g., the HD-Storm type Level E product type 512, in this example) to a project file. The project file, in some examples, may include configuration information, and links to the automatically generated specification (815A, 815B), the architectural details document (817), and the CAD/BIM files (819/821). In some embodiments, the portion 827 of the documents section 808 may also include a 'Share now' button 842 to allow the user to share specification, or other relevant project files, via email. Additionally, the portion 827 of the documents section 808 may include a 'Contact Us' button 844 to allow the user to contact the manufacturer, a technical support specialist, a system provider operating the specification development platform 100, or other qualified support personnel.

The method 200 proceeds to block 212 where a fourth user selection of a configuration option is received. Still with reference to the user interface 312 of FIG. 8 (the product detail page), in an embodiment of block 212, consider an example where the user would like to select a particular configuration option or modify a current selection of a particular configuration option. As one example, consider a case where the user would like to specify that the particular product type selected (e.g., the HD-Storm type Level E product type 512, in this example) operate using a 240V voltage supply, rather than a 120V voltage supply. As shown in the configuration options panel 802, the voltage supply may initially be set to 120V, for example by the system provider device 308, as this is the most popular (or most common) voltage supply configuration option. This initial configuration of the voltage supply is confirmed by item 832 in the configuration summary section 806, which corresponds to the selections shown and/or made via the configuration options panel 802. To select a particular configuration option or to modify a current selection of a particular configuration option, the user may click a drop-down menu 830 corresponding to the configuration option to be modified (e.g., the voltage supply, in this example). In some embodiments, once the user modifies the voltage supply to 240V via the corresponding drop-down menu 830, the user selection of the modified configuration option (e.g., the voltage supply, in this example) may be communicated to, and received by, the system provider device 308 over the network 106. As a result of receiving the user selection of the modified configuration option, the system provider device 308 may cause the user interface 312 to update the item 832 in the configuration summary section 806 such that the item 832 shows that the voltage supply is now set to 240V, in accordance with the modification made by the user via the configuration options panel 802.

Moreover, responsive to receiving the fourth user selection of the configuration option (block 212), the method 200 may in tandem perform the step of block 212A to automatically update, by the system provider device 308, the previously provided semi-customized specification (without additional user input or feedback) to thereby provide an updated customized specification via the documents section 808 of the user interface 312 of FIG. 8 (the product detail page). As a result, the multiple links 815A, 815B may now be links to the updated customized specification (e.g., provided in a variety of file formats such as PDF, DOC, DOCX, etc.). In some embodiments, the updated customized specification provided via the links 815A, 815B may include the fixed template portion and the dynamic portion, as described above. However, the dynamic portion of the specification is updated to include the modified configuration option (e.g., modification of the voltage supply to 240V, in this example) received via the fourth user selection (block 212).

In some embodiments, after automatically updating the specification (block 212A), the method 200 may return to block 212 where another user selection of a configuration option is received. For instance, the user may select another configuration option to modify (e.g., using the drop-down menu 830 corresponding to the additional configuration option to be modified). Once again, the user selection of the modified configuration option may be communicated to, and received by, the system provider device 308. As a result, the system provider device 308 may cause the user interface 312 to update the configuration summary section 806 accordingly. Further, based on the user modification of the additional configuration option, the system provider device 308 may again perform the step of block 212A to automatically update the specification (without additional user input or feedback) to include the additionally modified configuration option. In some embodiments, the method 200 may continue with the loop of blocks 212-212A for as many times as the user would like to modify or update selection of the various configuration options available for the selected system type, product type, and configuration type. In this manner, the user may cause the system provider device 308 to automatically update the specification to be fully-customized or exacting (e.g., where all user-selectable product configurations options have been selected, updated, or otherwise confirmed by the user).

It is also noted that in some embodiments, the user may alternatively provide a selection of a modified configuration option (block 212) by clicking on an 'X' icon 835 corresponding to the associated configuration option in the configuration summary section 806 that the user would like to remove or otherwise modify. For instance, in the illustrated example, if the user clicks on the icon 835 to remove the 'Panic Exit Device' option, the system provider device 308 will remove this option from the configuration summary section 806, and the system provider device 308 may again perform the step of block 212A to automatically update the specification (without additional user input or feedback) to include the additionally modified configuration option (e.g., removal of the 'Panic Exit Device' option).

Regardless of how a particular configuration option is modified (e.g., via the configuration options panel 802 or via the 'X' icon corresponding to an associated configuration option), in various embodiments, the system provider device 308 may automatically update a different configuration option based on compatibility between various configuration options. For instance, in response to a user modifying a first configuration option, the system provider device 308 may automatically modify a second configuration option such that the modified second configuration option is compatible both with the modified first configuration option and other configuration options. The automatically modified second configuration option may further be modified, by the system provider device 308, to be compatible with a particular building project associated with the specification, which may include compatibility with project scope, budget, schedule, local laws, regulations, building codes, environmental requirements, safety requirements, zoning bylaws, inspections, permits, licenses, etc. In response to the user modifying the first configuration option, and the system provider device 308 automatically updating the second configuration option (and possibly other configuration options), the system provider device 308 may once again perform the step of block 212A to automatically update the specification (without additional user input or feedback) to include changes introduced by the modified configuration options.

In some embodiments, and as a result of modification of one or more of the configuration options, the system provider device 308 may also update the other relevant files provided via the documents section 808 of the user interface 312, if needed. For example, if any of the modified configuration options result in changes to the architectural details document (link 817) or to the CAD/BIM files (links 819, 821), then the system provider device 308 may automatically update the corresponding documents and/or files such that the links 817, 819, 821 provide user access to the updated documents and/or files.

Further, in view of the above discussion and in at least some embodiments, the system provider device 308 may access project information such as project scope, budget, schedule, local laws, regulations, building codes, environmental requirements, safety requirements, zoning bylaws, inspections, permits, licenses, product inventory status, or other project information, prior to receiving the user selection of one or more of the system type (block 206), the product type (block 208), the configuration type (block 210), or the configuration options (block 212). In some embodiments, the system provider device 308 may access the project information via real-time communication with the manufacturer 103 and/or the other stakeholders 105 over the network 106, and/or by accessing information stored in the user database 318 and/or the system provider database 320. By accessing the project information prior to such selections, the system provider device 308 may cause the user interface 312 to only display the particular system types, product types, configuration types, and/or configuration options that are compatible with the accessed project information. For example, if the project information indicates construction of a high-security building (e.g., such as a bank), the system provider device 308 may cause the user interface 312 to only display the particular system types, product types, configuration types, and/or configuration options that include and/or are compatible with security options such as bullet resistant glass, blast proof doors, etc. In another example, if the project information indicates construction of a building in Miami-Dade County, Florida, where local building codes specify the use of hurricane-rated doors, the system provider device 308 may cause the user interface 312 to only display the particular system types, product types, configuration types, and/or configuration options that include and/or are compatible with hurricane-rated doors. In still another example, if the project information indicates construction of a cleanroom, the system provider device 308 may cause the user interface 312 to only display the particular system types, product types, configuration types, and/or configuration options that include and/or are compatible with cleanroom requirements (e.g., options for powder paint are not displayed since such finish is not allowed in cleanroom applications). As another example, if manufacturer, supplier, or distributor product information indicates a depleted inventory of a particular product, the system provider device 308 may cause the user interface 312 to only display the particular system types, product types, configuration types, and/or configuration options of which there is sufficient inventory for the particular project. While some examples of project information that may be accessed by the system provider device 308 to predetermine the particular system types, product types, configuration types, and/or configuration options to display to a user (e.g., via the user interface 312) have been provided, those skilled in the art in possession of the present disclosure will recognize other examples of project information that may equally be accessed for similar use by the system provider device 308, while remaining within the scope of the present disclosure.

Figure 9:
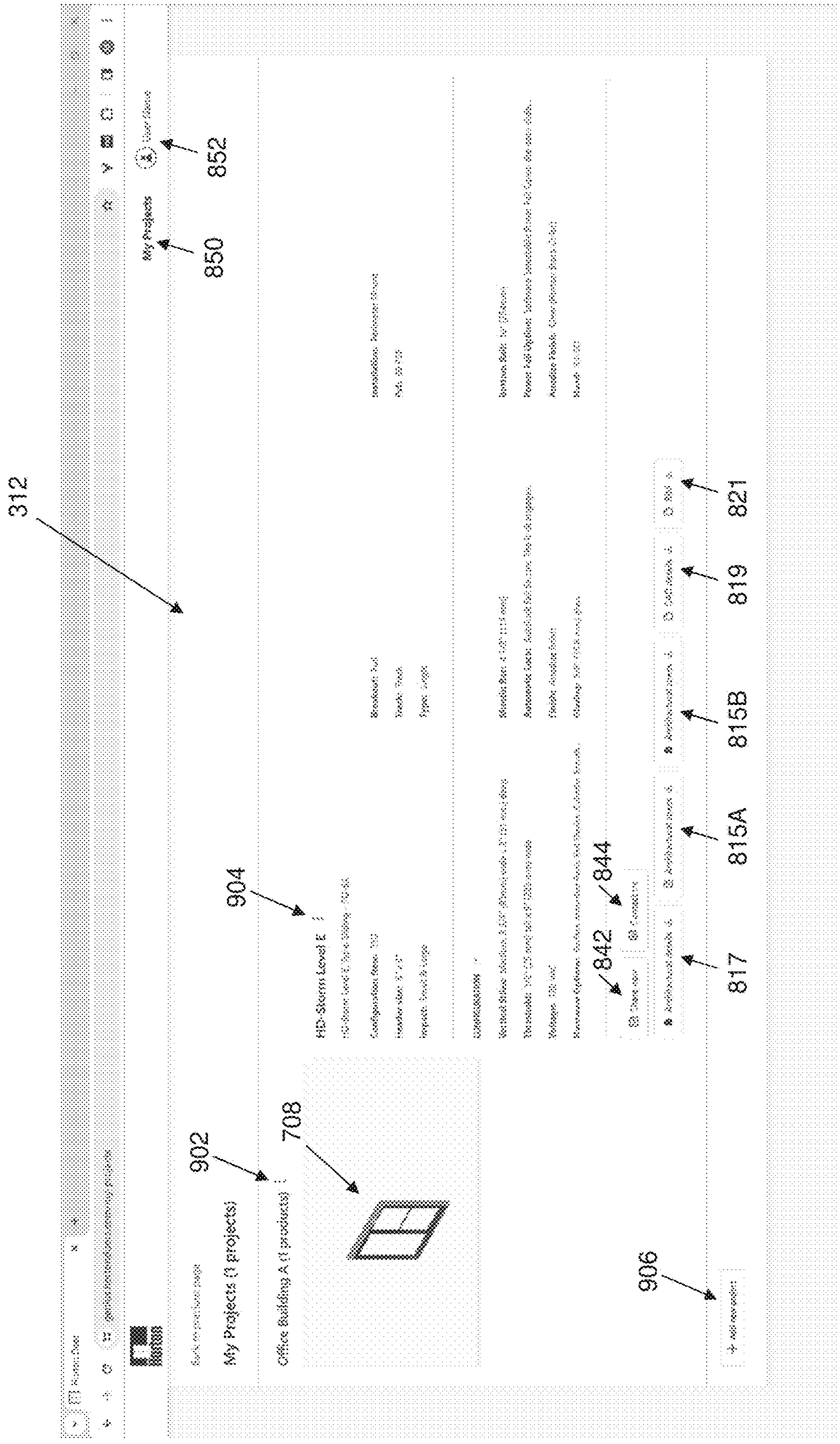

The method 200 proceeds to block 214 where additional functions are performed via the specification development platform 100. With reference to FIGS. 9-12, in an embodiment of block 212, some additional user-accessible functions of the specification development platform 100 are shown and described. In particular, and in some cases, the examples shown and described with reference to FIGS. 9-12 may be accessible to a user after logging into the specification development platform 100, as noted above with respect to block 204. For example, FIG. 9 illustrates the user interface 312 including a project page. The project page may be accessed, for example, via a 'My Projects' link 850 provided near a top of the user interface 312. A user account link 852 may also be provided to allow a user to update user account information (e.g., such as a name, company, industry, occupation, sector, phone number, etc.). In an embodiment, the project page includes project information for projects that have been saved, as well as products that have been saved to each project. In the illustrated example, one project entitled 'Office Building A' is saved, and one product (HD-Storm Level E sliding door) is saved to the project. For each product saved (e.g., such as the HD-Storm type Level E product, in this example), the project information may include configuration information including information from the configuration type section 804 (FIG. 8), information from the configuration options summary section 806 (FIG. 8), and information from the documents section 808 (FIG. 8), including links to the automatically generated specification (815A, 815B), the architectural details document (817), and the CAD/BIM files (819/821). In at least some examples and after a project has been saved, the system provider device 308 may receive a product update related to the particular configuration type of the particular product type that has been saved to the project. In response, the system provider device 308 may automatically update the specification previously saved to the project, and in some cases may also update other project information previously saved to the project. In some embodiments, the visual element 708 corresponding to the saved product is also included as part of the saved project. As previously noted, the visual element 708 may include an animatable image, a static image, a video, or other visual element. In some embodiments, the project page further includes a project menu 902 (e.g., such as a vertical ellipsis menu) that when clicked provides various project-related options such as viewing/editing project information, downloading and/or sharing the project, cloning the project, or deleting the project. Similarly, the project page may include a product menu 904 (e.g., such as a vertical ellipsis menu) that when clicked provides various product-related options such as returning to the product detail page (FIG. 8), cloning the product, or deleting the product. As shown, the project page may also include an 'Add project' button 906 to add a new project to the project page.

Figure 10:
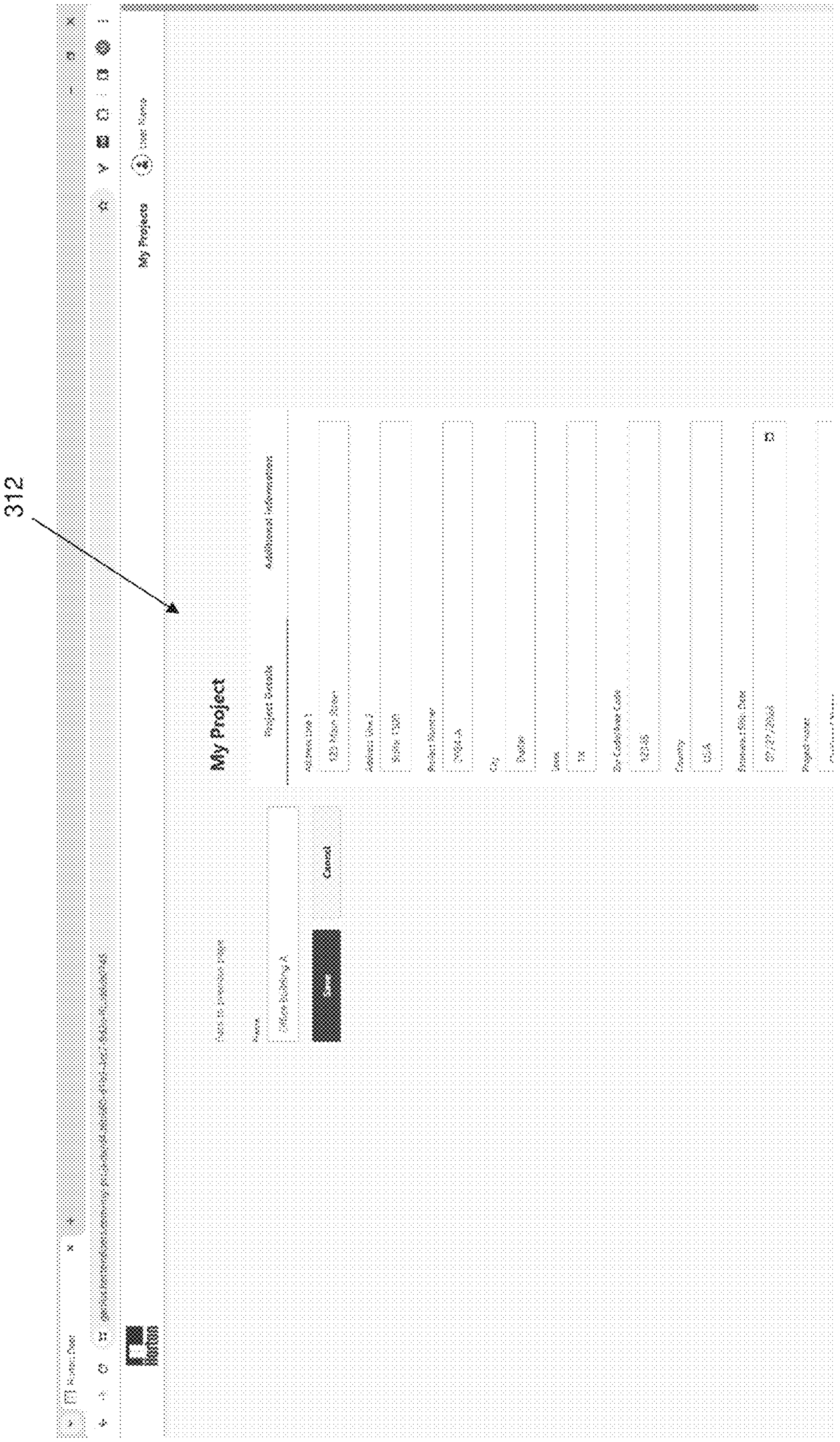
Figure 11:
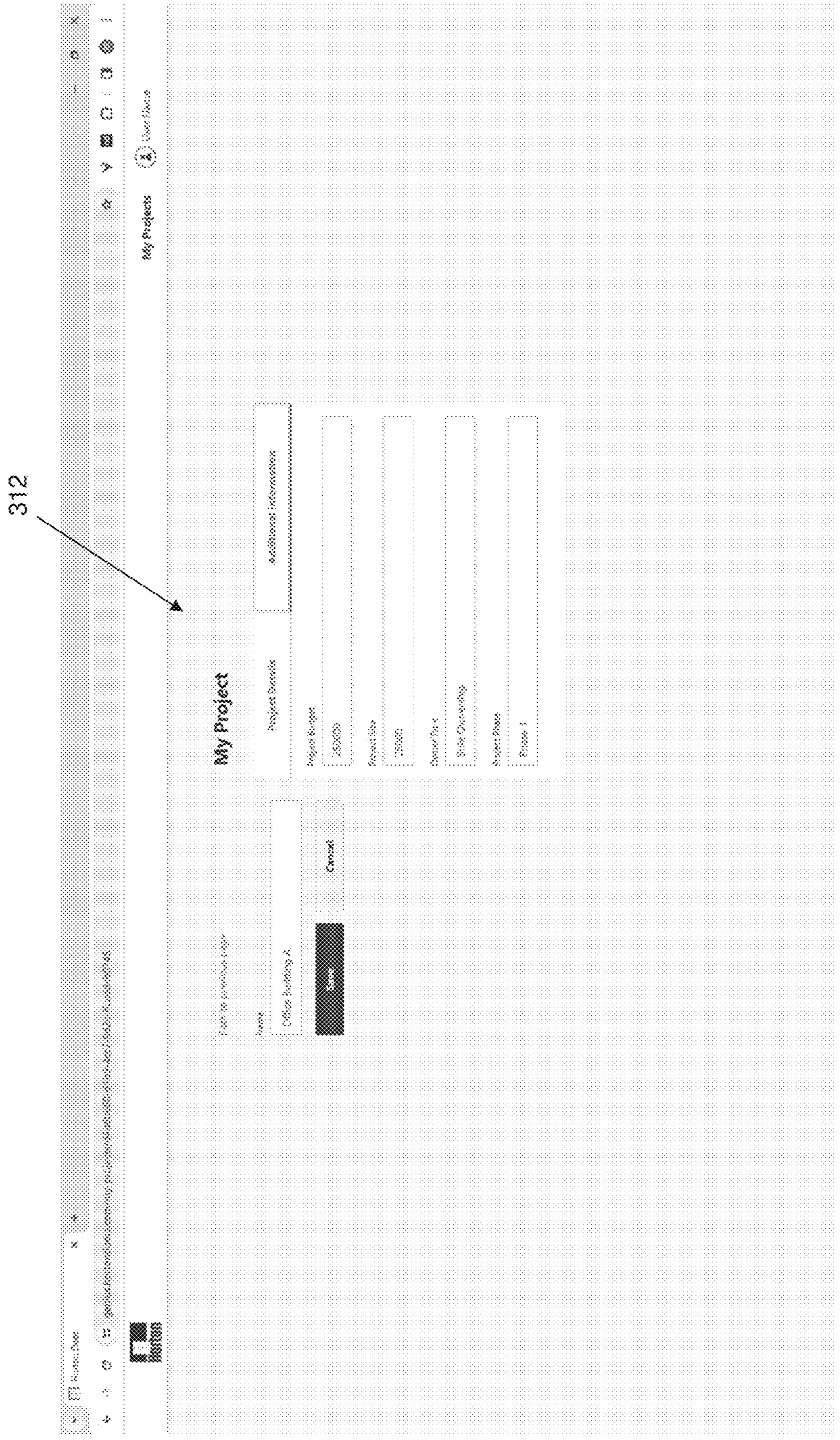

In another example, FIG. 10 illustrates a first portion of a project information page accessible via the project menu 902 of the project page of FIG. 9. As shown, the first portion of the project information page may include a project name and project details such as a project address, a project number, an estimated project ship date, and project notes. FIG. 11 illustrates a second portion of the project information page. As shown, the second portion of the project information page may include additional project information such as project budget, project size, owner type, or project phase. While some examples of project information that may be saved via the project information page have been provided, those skilled in the art in possession of the present disclosure will recognize other examples of project information that may equally be saved via the project information page, while remaining within the scope of the present disclosure. For instance, in some embodiments, the project information may include any information provided by the user, the manufacturer, or other project stakeholders, as discussed above.

Figure 12:
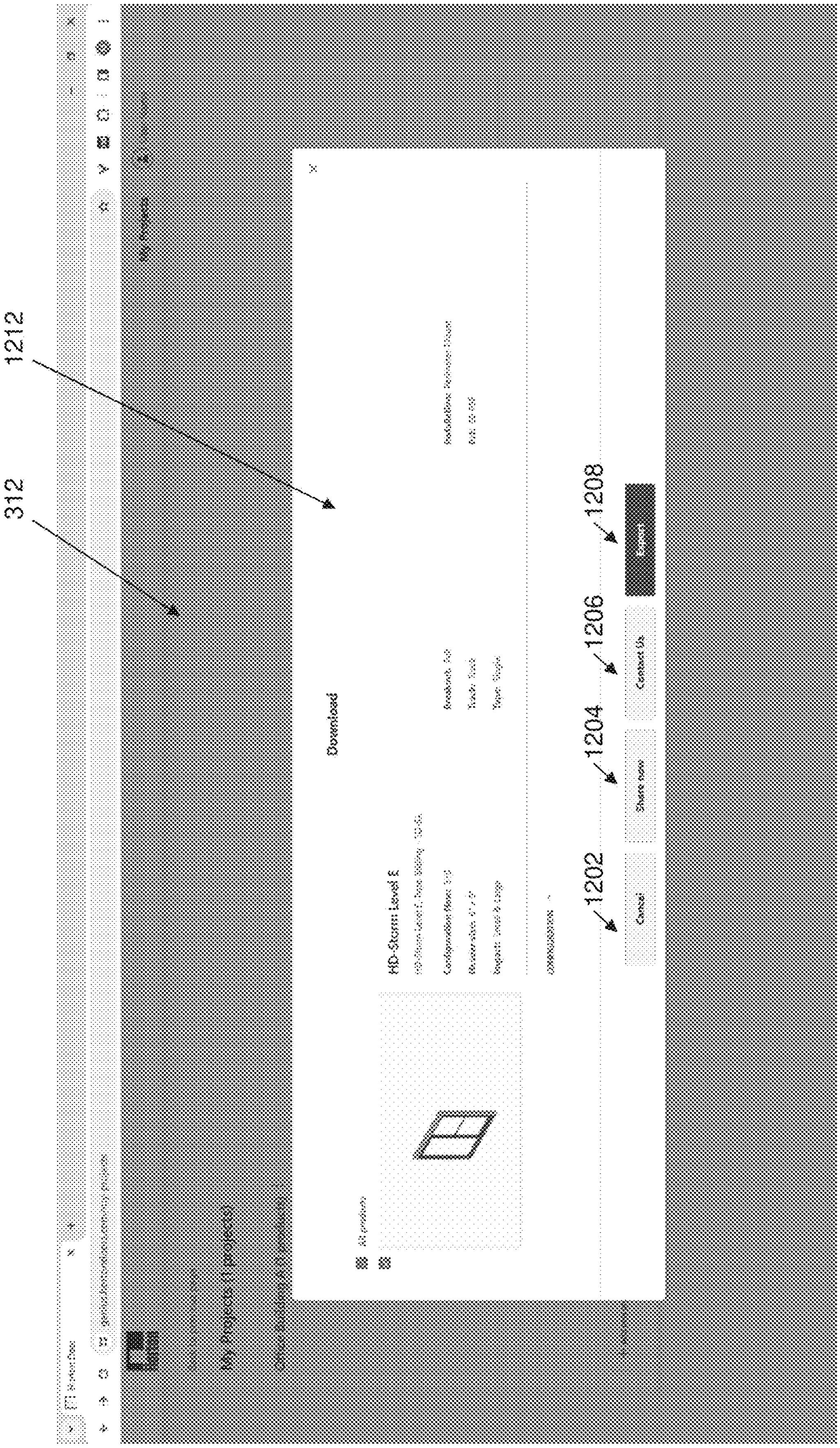

FIG. 12 illustrates a user interface 1212 for downloading and/or sharing the project (e.g., which may include a pop-up window that overlays the user interface 312, in this example), which is also accessible via the project menu 902 of the project page of FIG. 9. As shown, the user interface 1212 may include a 'Cancel' button 1202 that closes the user interface 1212 and returns to the project page (FIG. 9). The user interface 1212 may further include a 'Share now' button 1204 and a 'Contact Us' button 1206, which may provide similar functionality as the 'Share now' button 842 and the 'Contact Us' button 844, discussed above. In addition, the user interface 1212 may include an 'Export' button 1208 that allows the user to download a project package (e.g., as a compressed or zipped folder) that may include, for each product in the project, copies of the specification (e.g., in various file formats), the architectural details document, the CAD/BIM files, as well as related product and technical information, articles, guidelines, updates, and the like. In some embodiments, the project package may further include supplemental documents such as warranty documentation, an architect and facility management guide, a manufacturer's LEED statement, AAADM inspection and reports, and the like. Further, in some examples, the project package may include a project submittal document. The project submittal document, by way of example, by be automatically populated by the system provider to include project information (e.g., such as shown in FIGS. 10-11), names and contact information for relevant stakeholders (e.g., such as manufacturers, architects, contractors, distributors, suppliers, owners, project managers, regulatory bodies, or other stakeholders), as well as a detailed product list for each product included in the project associated with the submittal document. Thus, in some examples, the project package provided via the 'Export' button 1208 may include a full set of documents necessary to provide a complete submittal.

It will be understood that the examples given above, for example with reference to the method 200, are merely exemplary and are not meant be limiting in any way. Moreover, those of skill in the art in possession of this disclosure will recognize that various additional embodiments may be implemented in accordance with the methods described herein, while remaining within the scope of the present disclosure. For example, while a user may share a specification (or other relevant project files) via email, in some embodiments, additional users may be given access (e.g., via their respect user accounts) to projects on which they are collaborating. Thus, in some examples, multiple users may have access to the project page of FIG. 9, and may optionally have the ability to add, remove, or otherwise modify products (e.g., including product configurations) included within the project. In addition to providing for (or facilitating) more efficient collaboration, the disclosed embodiments thereby further provide for streamlined project management (e.g., by way of the various tools and resources included as part of the specification development platform 100).

Thus, systems and methods have been described that provide an intuitive web-based platform for enhancing and simplifying a product specification process for architects, specifiers, and other building industry professionals. The disclosed platform includes an intuitive and interactive interface that provides for dynamic, visually-guided selections of product configuration options that eliminates the need for manual editing of the specification, greatly reduces the need for specialized product knowledge, and virtually eliminates errors. As described above, the platform provides for automatic delivery of specifications having varying levels of customization including exacting specifications, semi-customized specifications, and generic specifications. The platform further includes logic to dynamically ensure compatibility of selected product configuration options, availability of products and particular configuration options (e.g., via communication with manufacturers and/or suppliers), compliance with applicable codes, and conformance with changes to project requirements. In various embodiments, the platform also integrates guidelines, articles, and other product knowledge into a centralized knowledge base to give architects and/or specifiers an enhanced product understanding and provide assistance in making informed decisions. The disclosed platform also provides tools for project management and collaboration to streamline workflows. Various examples of technological devices and systems that may be used to implement embodiments of the present disclosure are discussed in more detail below with reference to FIGS. 13-15.

Figure 13:
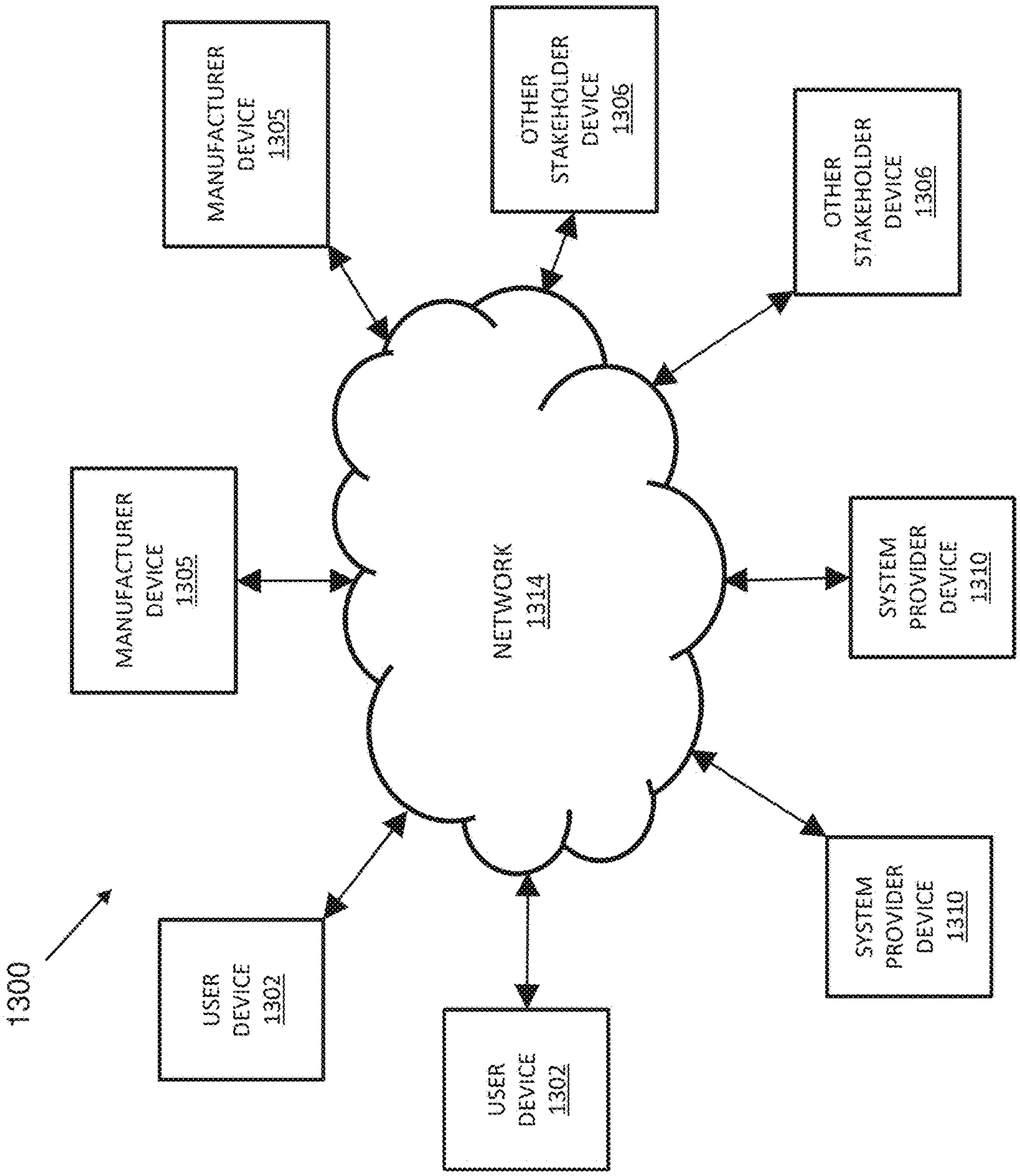
FIG. 13 is a schematic view illustrating an embodiment of a networked system, in accordance with some embodiments.

Referring first to FIG. 13, an embodiment of a network-based system 1300 for implementing one or more processes described herein is illustrated. As shown, the network-based system 1300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 13 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1300 illustrated in FIG. 13 includes a plurality of user devices 1302, a plurality of manufacturer devices 1305, a plurality of other stakeholder devices 1306, and/or one or more system provider devices 1310 in communication over one or more networks 1314. The user devices 1302 may be the user devices discussed above and may be operated by the users discussed above. The manufacturer devices 1305 may be the manufacturer devices discussed above and may be operated by the manufacturers discussed above. The other stakeholder devices may be the other stakeholder devices discussed above and may be operated by the other stakeholders discussed above. The system provider devices 1310 may be the system provider devices discussed above and may be operated by the system providers discussed above, and in some cases may include a manufacturer such as Horton Automatics™, a division of Overhead Door Corporation of Lewisville, TX.

The user devices 1302, manufacturer devices 1305, other stakeholder devices 1306, and/or system provider devices 1310 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1300, and/or accessible over the network 1314.

The network 1314 may be implemented as a single network or a combination of multiple networks. For example, in various embodiments, the network 1314 may include the Internet and/or one or more intranets, landline networks, wireless networks, and/or other appropriate types of networks.

The user devices 1302, manufacturer devices 1305, other stakeholder devices 1306, and/or system provider devices 1310 may be implemented using any appropriate combination of hardware and/or software configured for wired and/or wireless communication over the network 1314. For example, in one embodiment, the user devices 1302, manufacturer devices 1305, and/or other stakeholder devices 1306 may be implemented as a personal computer of a user in communication with the Internet. In other embodiments, the user devices 1302, manufacturer devices 1305, and/or other stakeholder devices 1306 may be a smart phone, wearable computing device, laptop computer, and/or other types of computing devices.

The user devices 1302, manufacturer devices 1305, and/or other stakeholder devices 1306 may include one or more browser applications which may be used, for example, to provide a convenient interface to permit the user (e.g., such as an architect or other specifier) to browse information available over the network 1314. For example, in one embodiment, the browser application may be implemented as a web browser configured to view information available over the Internet.

The user devices 1302, manufacturer devices 1305, and/or other stakeholder devices 1306 may also include one or more toolbar applications which may be used, for example, to provide user-side processing for performing desired tasks in response to operations selected by the user. In one embodiment, the toolbar application may display a user interface in connection with the browser application.

The user devices 1302, manufacturer devices 1305, and/or other stakeholder devices 1306 may further include other applications as may be desired in particular embodiments to provide desired features to the user devices 1302, manufacturer devices 1305, and/or other stakeholder devices 1306. The other applications may also include security applications for implementing user-side security features, programmatic user applications for interfacing with appropriate application programming interfaces (APIs) over the network 1314, or other types of applications. Email and/or text applications may also be included, which allow a user to send and receive emails and/or text messages through the network 1314. The user devices 1302, manufacturer devices 1305, and/or other stakeholder devices 1306 may include one or more user and/or device identifiers which may be implemented, for example, as operating system registry entries, cookies associated with the browser application, identifiers associated with hardware of the user devices 1302, manufacturer devices 1305, and/or other stakeholder devices 1306, or other appropriate identifiers, such as a phone number. In one embodiment, the user identifier may be used by the system provider to associate the user with a particular user account. The manufacturer devices 1305 and/or other stakeholder devices 1306 may also include a system provider application, managed by a system provider device, to implement one or more aspects of the method 200 and/or other aspects of the various embodiments described herein.

Figure 14:
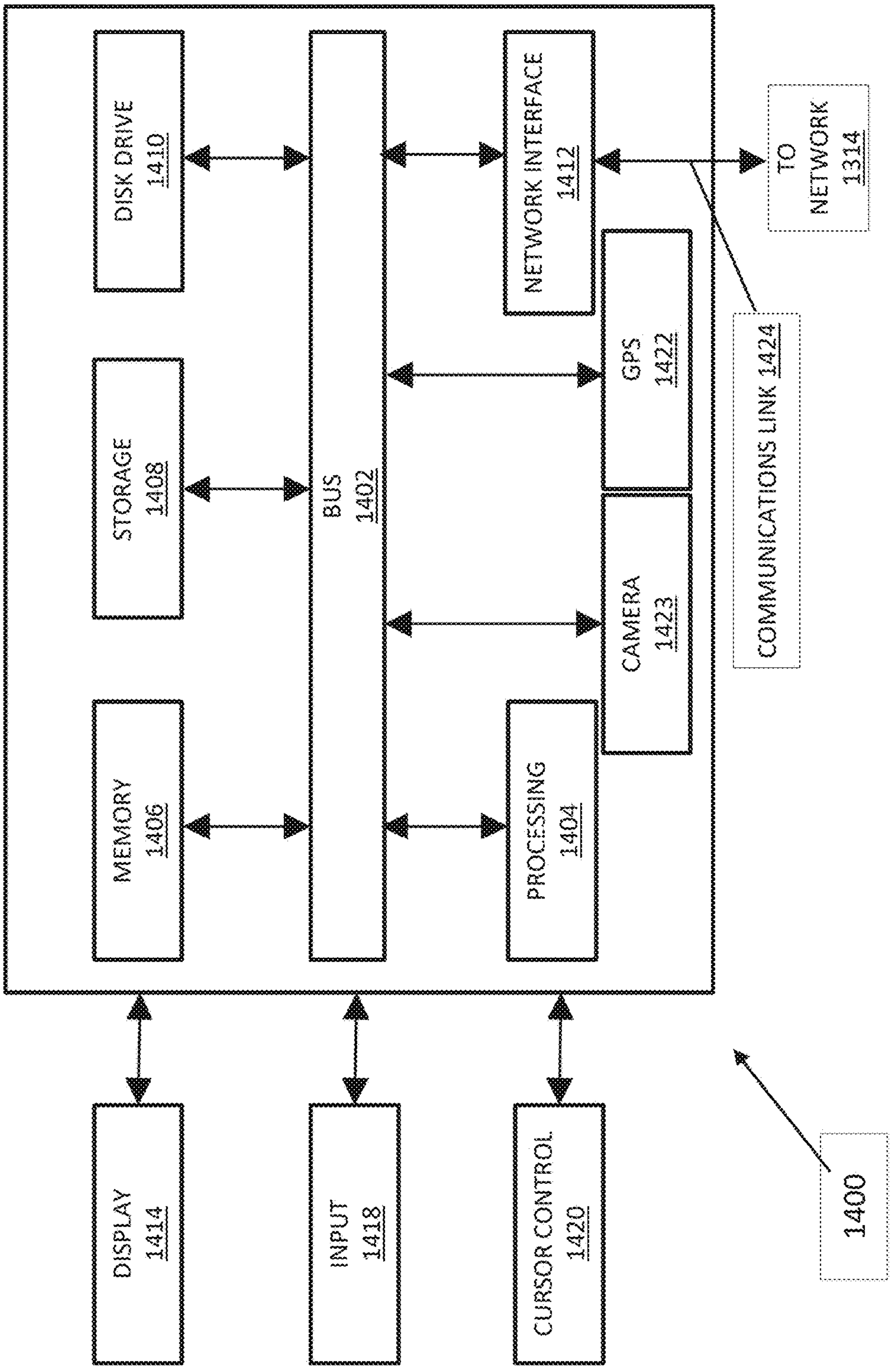
FIG. 14 is a schematic view illustrating an embodiment of a computer system, in accordance with some embodiments.

Referring now to FIG. 14, an embodiment of a computer system 1400 suitable for implementing, for example, the user devices 102, 302, 1302, manufacturer devices 1305, other stakeholder devices 1306, and/or system provider devices 108, 308, 1310, is illustrated. It should be appreciated that other devices utilized by specifiers, other project stakeholders (e.g., such as owners, project managers, contractors, subcontractors, manufacturers, suppliers, distributors, etc.), and/or system providers in the system discussed above may be implemented as the computer system 1400 in a manner as follows.

In accordance with various embodiments of the present disclosure, computer system 1400, such as a computer and/or a network server, includes a bus 1402 or other communication mechanism for communicating information, which interconnects subsystems and components, such as a processing component 1404 (e.g., processor, micro-controller, digital signal processor (DSP), etc.), a system memory component 1406 (e.g., RAM), a static storage component 1408 (e.g., ROM), a disk drive component 1410 (e.g., magnetic or optical), a network interface component 1412 (e.g., modem or Ethernet card), a display component 1414 (e.g., CRT or LCD), an input component 1418 (e.g., keyboard, keypad, or virtual keyboard), a cursor control component 1420 (e.g., mouse, pointer, or trackball), a location determination component 1422 (e.g., a Global Positioning System (GPS) device as illustrated, a cell tower triangulation device, and/or a variety of other location determination devices known in the art), and/or a camera component 1423. In one implementation, the disk drive component 1410 may comprise a database having one or more disk drive components.

In accordance with embodiments of the present disclosure, the computer system 1400 performs specific operations by the processor 1404 executing one or more sequences of instructions contained in the memory component 1406, such as described herein with respect to the user devices 102, 302, 1302, manufacturer devices 1305, other stakeholder devices 1306, and/or system provider devices 108, 308, 1310. Such instructions may be read into the system memory component 1406 from another computer readable medium, such as the static storage component 1408 or the disk drive component 1410. In other embodiments, hard-wired circuitry may be used in place of or in combination with software instructions to implement the present disclosure.

Logic may be encoded in a computer readable medium, which may refer to any medium that participates in providing instructions to the processor 1404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1410, volatile media includes dynamic memory, such as the system memory component 1406, and transmission media includes coaxial cables, copper wire, and fiber optics, including wires that comprise the bus 1402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1400. In various other embodiments of the present disclosure, a plurality of the computer systems 1400 coupled by a communication link 1424 to the network 1314 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1400 may transmit and receive messages, data, information and instructions, including one or more programs (i.e., application code) through the communication link 1424 and the network interface component 1412. The network interface component 1412 may include an antenna, either separate or integrated, to enable transmission and reception via the communication link 1424. Received program code may be executed by processor 1404 as received and/or stored in disk drive component 1410 or some other non-volatile storage component for execution.

Figure 15:
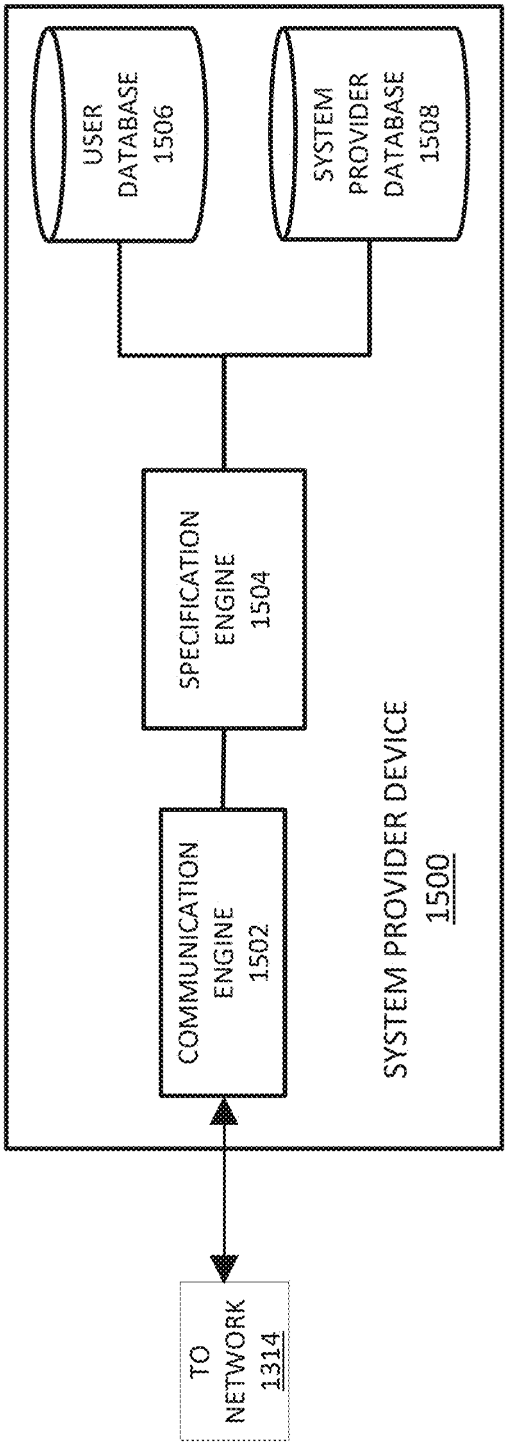
FIG. 15 is a schematic view illustrating an embodiment of a system provider device, in accordance with some embodiments.

Referring now to FIG. 15, an embodiment of a system provider device 1500 is illustrated. In an embodiment, the system provider device 1500 may be the system provider devices discussed above. The system provider device 1500 includes a communication engine 1502 that is coupled to the network 1314 and to specification engine 1504 that is coupled to a user information database 1506 and a system provider database 1508. The communication engine 1502 may be software or instructions stored on a computer-readable medium that allows the device 1500 to send and receive information over the network 1314. The specification engine 1504 may be software or instructions stored on a computer-readable medium that, when executed by a processor, is configured to provide a specification development platform (e.g., such as the specification development platform 100) that includes an intuitive and interactive interface with dynamic, visually-guided selections of product configuration options, automatically provide specifications having varying levels of customization, dynamically ensure compatibility of selected product configuration options, availability of products and particular configuration options, compliance with applicable codes, conformance with changes to project requirements, provide a centralized knowledge base to give architects and/or specifiers an enhanced product understanding and provide assistance in making informed decisions, provide tools for project management and collaboration to streamline workflows, update entries of the user information database 1506 or the system provider database 1508, as well as provide any of the other functionality that is discussed above. While the databases 1506 and 1508 have been illustrated as located in the device 1500, one of skill in the art will recognize that they may be connected to the specification engine 1504 through the network 1314 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide the features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of providing a specification development platform, comprising:

providing, by a system provider device over an Internet connection with a user device, a first webpage rendered by a web browser of the user device, the first webpage displaying a plurality of product types corresponding to a particular system type;

receiving, by the system provider device via the Internet connection with the user device, a first user selection of a particular product type of the plurality of product types via the first webpage, the first user selection causing the web browser of the user device to render a second webpage in the web browser, the second webpage displaying a plurality of configuration types corresponding to the particular product type of the first user selection, and the second webpage including a visual element corresponding to each of the plurality of configuration types;

receiving, by the system provider device via the Internet connection with the user device, a second user selection of a particular configuration type of the plurality of configuration types via the second webpage, the second user selection causing the web browser of the user device to render a third webpage in the web browser, the third webpage displaying a product detail page corresponding to the particular configuration type of the second user selection, the product detail page including the visual element corresponding to the particular configuration type of the second user selection, a configuration summary section, a documents section, and a configuration options panel, the second user selection further causing the system provider device to automatically provide, by a specification engine of the system provider device and without additional user input, an architectural specification accessible via a first link provided within the documents section of the product detail page when the third webpage is rendered;

after receiving the second user selection of the particular configuration type, receiving, by the system provider device over the Internet connection with the user device, a third user selection to modify a first configuration option of the particular configuration type, the third user selection causing the system provider device to automatically update, by the specification engine of the system provider device and without additional user input, the architectural specification in correspondence with the modified first configuration option; and after receiving the third user selection, saving, by the system provider device, the updated architectural specification to a project file within a database accessible by the system provider device.

2. The method of claim 1, wherein prior to receiving the third user selection, the architectural specification accessible via the first link includes a semi-customized architectural specification having a fixed template portion and a dynamic portion, the dynamic portion populated with a default set of common configuration options.

3. The method of claim 1, wherein the visual element includes an animatable image that is animated upon hovering a mouse pointer over the animatable image.

4. The method of claim 1, further comprising:

prior to receiving the second user selection of the particular configuration type, receiving, by the system provider device, a fourth user selection of a second link to a generic architectural specification, the second link provided within the second webpage, the generic architectural specification corresponding to the particular product type of the first user selection, the generic architectural specification including a fully-editable document including each configuration type and each configuration option, associated with the particular product type, available for selection by a user of the user device.

5. The method of claim 1, wherein the third user selection to modify the first configuration option of the particular configuration type is received via the configuration options panel on the product detail page.

6. The method of claim 1, wherein the updated architectural specification includes a fully-customized architectural specification having a fixed template portion and a dynamic portion, the dynamic portion populated with one or more modified configuration options including at least the modified first configuration option.

7. The method of claim 1, further comprising:

in response to receiving the third user selection of the modified first configuration option, automatically modifying, by the system provider device, a second configuration option of the particular configuration type, the modified second configuration option compatible with the modified first configuration option, the automatically modifying the second configuration option causing the system provider device to automatically further update the architectural specification in correspondence with the modified second configuration option.

8. The method of claim 1, further comprising:

prior to receiving the first user selection of the particular product type, accessing, by the system provider device, project information, wherein the second webpage displays at least one configuration type, of the plurality of configuration types, that is compatible with the accessed project information; and receiving, by the system provider device, the second user selection of the particular configuration type, the particular configuration type including the at least one configuration type that is compatible with the accessed project information.

9. The method of claim 1, wherein the documents section of the product detail page further includes respective links to an architectural details document, a computer-aided design (CAD) file, and a building information modeling (BIM) file corresponding to the particular configuration type.

10. The method of claim 5, further comprising:

after saving the updated architectural specification to the project file, receiving, by the system provider device, a product update related to the particular configuration type; and in response to receiving the product update, further updating, by the system provider device, the updated architectural specification saved to the project file within the database accessible by the system provider device.

11. A system, comprising:

a non-transitory memory storing instructions; and one or more hardware processors configured to execute the instructions to cause the system to perform operations comprising:

providing, by a system provider device over an Internet connection with a user device, a first webpage rendered by a web browser of the user device, the first webpage displaying a plurality of product types corresponding to a particular system type;

receiving, by the system provider device via the Internet connection with the user device, a first user selection of a particular product type of the plurality of product types via the first webpage, the first user selection causing the web browser of the user device to render a second webpage in the web browser, the second webpage displaying a plurality of configuration types corresponding to the particular product type of the first user selection, and the second webpage including a visual element corresponding to each of the plurality of configuration types;

receiving, by the system provider device via the Internet connection with the user device, a second user selection of a particular configuration type of the plurality of configuration types via the second webpage, the second user selection causing the web browser of the user device to render a third webpage in the web browser, the third webpage displaying a product detail page corresponding to the particular configuration type of the second user selection, the product detail page including the visual element corresponding to the particular configuration type of the second user selection, a configuration summary section, a documents section, and a configuration options panel, the second user selection further causing the system provider device to automatically provide, by a specification engine of the system provider device and without additional user input, an architectural specification accessible via a first link provided within the documents section of the product detail page when the third webpage is rendered;

after receiving the second user selection of the particular configuration type, receiving, by the system provider device over the Internet connection with the user device, a third user selection to modify a first configuration option of the particular configuration type, the third user selection causing the system provider device to automatically update, by the specification engine of the system provider device and without additional user input, the architectural specification in correspondence with the modified first configuration option; and after receiving the third user selection, saving, by the system provider device, the updated architectural specification to a project file within a database accessible by the system provider device.

12. The system of claim 11, wherein prior to receiving the third user selection, the architectural specification accessible via the first link includes a semi-customized architectural specification having a fixed template portion and a dynamic portion, the dynamic portion populated with a default set of common configuration options.

13. The system of claim 11, wherein the visual element includes an animatable image that is animated upon hovering a mouse pointer over the animatable image.

14. The system of claim 11, wherein the operations further comprise:

prior to receiving the second user selection of the particular configuration type, receiving, by the system provider device, a fourth user selection of a second link to a generic architectural specification, the second link provided within the second webpage, the generic architectural specification corresponding to the particular product type of the first user selection, the generic architectural specification including a fully-editable document including each configuration type and each configuration option, associated with the particular product type, available for selection by a user of the user device.

15. The system of claim 11, wherein the third user selection to modify the first configuration option of the particular configuration type is received via the configuration options panel on the product detail page.

16. The system of claim 11, wherein the updated architectural specification includes a fully-customized architectural specification having a fixed template portion and a dynamic portion, the dynamic portion populated with one or more modified configuration options including at least the modified first configuration option.

17. The system of claim 11, wherein the operations further comprise:

in response to receiving the third user selection of the modified first configuration option, automatically modifying, by the system provider device, a second configuration option of the particular configuration type, the modified second configuration option compatible with the modified first configuration option, the automatically modifying the second configuration option causing the system provider device to automatically further update the architectural specification in correspondence with the modified second configuration option.

18. A non-transitory machine-readable medium having stored thereon machine-readable instructions executable to cause a machine to perform operations comprising:

providing, by a system provider device over an Internet connection with a user device, a first webpage rendered by a web browser of the user device, the first webpage displaying a plurality of product types corresponding to a particular system type;

receiving, by the system provider device via the Internet connection with the user device, a first user selection of a particular product type of the plurality of product types via the first webpage, the first user selection causing the web browser of the user device to render a second webpage in the web browser, the second webpage displaying a plurality of configuration types corresponding to the particular product type of the first user selection, and the second webpage including a visual element corresponding to each of the plurality of configuration types;

receiving, by the system provider device via the Internet connection with the user device, a second user selection of a particular configuration type of the plurality of configuration types via the second webpage, the second user selection causing the web browser of the user device to render a third webpage in the web browser, the third webpage displaying a product detail page corresponding to the particular configuration type of the second user selection, the product detail page including the visual element corresponding to the particular configuration type of the second user selection, a configuration summary section, a documents section, and a configuration options panel, the second user selection further causing the system provider device to automatically provide, by a specification engine of the system provider device and without additional user input, an architectural specification accessible via a first link provided within the documents section of the product detail page when the third webpage is rendered;

after receiving the second user selection of the particular configuration type, receiving, by the system provider device over the Internet connection with the user device, a third user selection to modify a first configuration option of the particular configuration type, the third user selection causing the system provider device to automatically update, by the specification engine of the system provider device and without additional user input, the architectural specification in correspondence with the modified first configuration option; and after receiving the third user selection, saving, by the system provider device, the updated architectural specification to a project file within a database accessible by the system provider device.

19. The non-transitory machine-readable medium of claim 18, wherein prior to receiving the third user selection, the architectural specification accessible via the first link includes a semi-customized architectural specification having a fixed template portion and a dynamic portion, the dynamic portion populated with a default set of common configuration options.

20. The non-transitory machine-readable medium of claim 18, wherein the visual element includes an animatable image that is animated upon hovering a mouse pointer over the animatable image.

* * * * *